(12) United States Patent
Hashimoto et al.

(10) Patent No.: US 11,834,052 B2
(45) Date of Patent: Dec. 5, 2023

(54) ESTIMATOR GENERATION APPARATUS, MONITORING APPARATUS, ESTIMATOR GENERATION METHOD, AND COMPUTER-READABLE STORAGE MEDIUM STORING ESTIMATOR GENERATION PROGRAM

(71) Applicant: OMRON Corporation, Kyoto (JP)

(72) Inventors: Atsushi Hashimoto, Tokyo (JP); Yoshitaka Ushiku, Tokyo (JP); Yasuyo Kotake, Tokyo (JP)

(73) Assignee: OMRON Corporation, Kyoto (JP)

( * ) Notice: Subject to any disclaimer, the term of this patent is extended or adjusted under 35 U.S.C. 154(b) by 435 days.

(21) Appl. No.: 17/276,498

(22) PCT Filed: Mar. 13, 2019

(86) PCT No.: PCT/JP2019/010185
§ 371 (c)(1),
(2) Date: Mar. 16, 2021

(87) PCT Pub. No.: WO2020/090134
PCT Pub. Date: May 7, 2020

(65) Prior Publication Data
US 2021/0269046 A1 Sep. 2, 2021

(30) Foreign Application Priority Data
Oct. 29, 2018 (JP) .................................. 2018-203331

(51) Int. Cl.
*B60W 40/09* (2012.01)
*G06V 40/16* (2022.01)
(Continued)

(52) U.S. Cl.
CPC ............. *B60W 40/09* (2013.01); *G06N 20/00* (2019.01); *G06V 10/764* (2022.01); *G06V 10/82* (2022.01);
(Continued)

(58) Field of Classification Search
CPC ..... B60W 2040/0872; B60W 2540/22; B60W 40/09; G06N 20/00; G06N 3/045;
(Continued)

(56) References Cited

U.S. PATENT DOCUMENTS

2018/0116620 A1   5/2018   Chen et al.
2018/0189581 A1   7/2018   Turcot et al.
(Continued)

FOREIGN PATENT DOCUMENTS

JP   2007-257043 A   10/2007
JP   6264492 B1       1/2018
(Continued)

OTHER PUBLICATIONS

Lei Zhao, "Human fatigue expression recognition through image-based dynamic multi-information and bimodal deep learning," Oct. 6, 2016, Journal of Electronic Imaging, vol. 25, Issue 5, 053024 (Oct. 2016), pp. 053024-2-053024-7.*
(Continued)

*Primary Examiner* — Omar S Ismail
(74) *Attorney, Agent, or Firm* — METROLEX IP LAW GROUP, PLLC

(57) ABSTRACT

An estimator generation apparatus may include a first estimator and a second estimator sharing a common encoder. The first estimator may be trained to determine a target person's state from face image data. The second estimator may be trained to reconstruct physiological data from face image data. The machine learning may allow the common encoder to have its parameters converging toward higher-
(Continued)

accuracy local solutions for estimating the target person's state, thus generating the estimator that may estimate the target person's state more accurately.

20 Claims, 8 Drawing Sheets

(51) Int. Cl.

| | | |
|---|---|---|
| *G06V 10/764* | (2022.01) | |
| *G06V 10/82* | (2022.01) | |
| *G06V 20/59* | (2022.01) | |
| *G06V 40/70* | (2022.01) | |
| *B60W 40/08* | (2012.01) | |
| *G06V 40/10* | (2022.01) | |
| *G06N 20/00* | (2019.01) | |

(52) U.S. Cl.
CPC .......... *G06V 20/597* (2022.01); *G06V 40/174* (2022.01); *G06V 40/70* (2022.01); *B60W 2040/0872* (2013.01); *B60W 2540/22* (2013.01); *G06V 40/15* (2022.01)

(58) Field of Classification Search
CPC ...... G06N 3/047; G06N 3/084; G06V 10/764; G06V 10/82; G06V 20/597; G06V 40/15; G06V 40/174; G06V 40/70
See application file for complete search history.

(56) References Cited

U.S. PATENT DOCUMENTS

| | | | | |
|---|---|---|---|---|
| 2019/0213429 | A1* | 7/2019 | Sicconi | G06F 3/012 |
| 2019/0225232 | A1* | 7/2019 | Blau | G05D 1/0088 |
| 2019/0258251 | A1* | 8/2019 | Ditty | B60W 50/023 |
| 2019/0295282 | A1* | 9/2019 | Smolyanskiy | G06F 18/22 |
| 2019/0370580 | A1 | 12/2019 | Aoi et al. | |
| 2020/0005060 | A1* | 1/2020 | Martin | G06V 20/597 |
| 2020/0057487 | A1* | 2/2020 | Sicconi | G06T 7/254 |
| 2020/0079385 | A1* | 3/2020 | Beaurepaire | B60W 30/025 |
| 2020/0081611 | A1* | 3/2020 | Beaurepaire | G06F 3/04847 |

FOREIGN PATENT DOCUMENTS

| | | |
|---|---|---|
| WO | 2018/118958 A1 | 6/2018 |
| WO | 2018/168040 A1 | 9/2018 |

OTHER PUBLICATIONS

Klas Ihme,"Recognizing Frustration of Drivers From Face Video Recordings and Brain Activation Measurements With Functional Near-Infrared Spectroscopy,"Aug. 17, 2018, Frontiers in Human Neuroscience, Sec. Cognitive Neuroscience, Volume Dec. 2018,Article 327,pp. 1-7.*
Weibo Liua, "A survey of deep neural network architectures and their applications," Dec. 18, 2016, Neurocomputing, vol. 234, Apr. 19, 2017, pp. 12-16.*
Kwan Woo Lee, "Convolutional Neural Network-Based Classification of Driver's Emotion during Aggressive and Smooth Driving Using Multi-Modal Camera Sensors,"Mar. 23, 2018,Sensors 2018, 18(4), 957,p. 1-8.*
Miguel Bordallo Lopez, "Detecting exercise-induced fatigue using thermal imaging and deep learning," Mar. 2, 2018, 2017 Seventh International Conference on Image Processing Theory, Tools and Applications (IPTA), pp. 1-3,5.*
Lin Shu, "A Review of Emotion Recognition Using Physiological Signals," Jun. 28, 2018, Sensors 2018, 18(7), 2074, pp. 1-16.*
Handi Yu, "Intelligent Corner Synthesis via Cycle-Consistent Generative Adversarial Networks for Efficient Validation of Autonomous Driving Systems," Feb. 22, 2018, 2018 23rd Asia and South Pacific Design Automation Conference (ASP-DAC), pp. 1-3.*
An extended European search report (EESR) dated Jan. 27, 2022 in a counterpart European patent application.
Marvin Teichmann et al: "MultiNet: Real-time Joint Semantic Reasoning for Autonomous Driving", May 8, 2018, p. 1-10, XP055604573, Retrieved from the Internet Jul. 11, 2019: URL:https://arxiv.org/pdf/1612.07695.pdf, Relevance is indicated in the EESR issued on Jan. 27, 2022 in a counterpart European patent application.
Hiroko Adachi et al., "Discrimination of Drowsiness Level Based on Facial Skin Thermogram using CNN", the technical journal of the IEICE, Mar. 6, 2017, pp. 83-86, vol. 116, No. 520. Relevance is indicated in the (translated) ISR/WO mailed on Jun. 18, 2019.
An English translation of the International Search Report ("ISR") of PCT/2019/010185 dated Jun. 18, 2019.
The Written Opinion("WO") of PPCT/2019/010185 dated Jun. 18, 2019.

* cited by examiner

ESTIMATOR GENERATION APPARATUS, MONITORING APPARATUS, ESTIMATOR GENERATION METHOD, AND COMPUTER-READABLE STORAGE MEDIUM STORING ESTIMATOR GENERATION PROGRAM

FIELD

The present invention relates to an estimator generation apparatus, a monitoring apparatus, an estimator generation method, and an estimator generation program.

BACKGROUND

To prevent automobile accidents resulting from, for example, falling asleep or sudden changes in the driver's physical conditions, techniques have been developed recently for monitoring the states of drivers. Also, the move has been accelerated toward practical use of autonomous driving of automobiles. In autonomous driving that controls the steering of an automobile using a system, a driver may take over the driving from the system in certain situations. Thus, the driver state is to be monitored during autonomous driving to determine whether the driver is prepared for a driving operation. Such monitoring of the driver state during autonomous driving is also discussed at the intergovernmental meeting (WP29) of the United Nations Economic Commission for Europe (UN-ECE). This has accelerated the development efforts for driver state monitoring techniques.

As an example technique for estimating the driver state, Patent Literature 1 describes an apparatus for estimating the driver state (e.g., drowsiness) by obtaining face image data including the driver's face with a camera and analyzing the obtained face image data. More specifically, the apparatus described in Patent Literature 1 uses a trained model with, for example, a neural network, and estimates the driver state based on feature points on the face extracted from face image data. This apparatus can estimate the driver state from face image data.

CITATION LIST

Patent Literature

Patent Literature 1: Japanese Unexamined Patent Application Publication No. 2007-257043

SUMMARY

Technical Problem

The inventors have noticed issues associated with such known methods including the method described in Patent Literature 1. An estimator can be constructed through machine learning for estimating a target person's state from face image data. However, the feature quantity determined with human-designed extraction of face feature points, as described in Patent Literature 1, may not always reflect the target person's state. In response to such issues, a learning model such as a neural network may be trained to directly estimate the target person's state from face image data. With this method, the learning model automatically designs the feature quantity determined from face images in the process of learning. Thus, the trained learning model allows accurate estimation of the target person's state from face image data. However, a model that determines answer data from learning data (input data) has multiple local optimal solutions, and a learning model such as a neural network has parameters known to converge toward any of local solutions in the process of machine learning. In machine learning processes, the parameters in the learning model may converge toward less accurate local solutions for estimating the target person's state from face image data.

Thus, the inventors have noticed that known methods may fail to construct an estimator (trained learning model) that can accurately estimate the target person's state from face image data. Such issues can arise in any estimation of a target person's state from observation data obtained by observing the target person's activity, including estimating the state of a worker on a production line and estimating the driver state as described above.

One or more aspects of the present invention are directed to a technique for generating an estimator that can estimate a target person's state more accurately.

Solution to Problem

In response to the above issue, the estimator generation apparatus, the monitoring apparatus, the estimator generation method, and the estimator generation program according to one or more aspects of the present invention have the structure described below.

An estimator generation apparatus according to an aspect of the present invention includes a learning data obtainer and a learning processor. The learning data obtainer obtains a plurality of first learning datasets each including a combination of first face image data including a face of a subject driving a vehicle and first state information data representing a state of the subject during driving of the vehicle. The learning data obtainer obtains a plurality of second learning datasets each including a combination of second face image data including the face of the subject and first physiological data obtained by measuring a physiological parameter about the subject with a sensor. The learning processor constructs a first estimator by performing machine learning on the first estimator. The first estimator includes an encoder and an estimation unit connected to the encoder to receive an output from the encoder. The first estimator is trained to output, in response to the encoder receiving an input of the first face image data included in a first learning dataset of the plurality of first learning datasets, an output value corresponding to the state of the subject represented by the first state information data associated with the input first face image data from the estimation unit. The learning processor constructs a second estimator by performing machine learning on the second estimator. The second estimator includes the encoder in the first estimator and a decoder connected to the encoder to receive an output from the encoder. The second estimator is trained to output, in response to the encoder receiving an input of the second face image data included in a second learning dataset of the plurality of second learning datasets, output data reconstructed from the first physiological data associated with the input second face image data from the decoder.

In the above structure, the first estimator and the second estimator share the common encoder. The first estimator is trained to determine the first state information data from the first face image data through machine learning using the plurality of first learning datasets. The second estimator is trained to determine the first physiological data from the second face image data through machine learning using the plurality of second learning datasets. Thus, the common encoder has the output (feature quantity) designed to determine the first state information data and the first physiological data through machine learning on the first and second estimators.

The physiological data can include higher-order information about the human state than the state information data. The common encoder is trained to determine the first physiological data that can include higher-order information in addition to the first state information data. The common encoder thus has its parameters converging toward higher-accuracy local solutions for determining the first state information data (or in other words, for estimating the target person's state). The estimator (first estimator) generated in the above structure can thus estimate the target person's state more accurately.

The first face image data may be the same as or different from the second face image data. The state information data may be any data about a target person's state that can be selected as appropriate for each embodiment. The physiological data is obtained by measuring, with one or more sensors, a physiological parameter that can be associated with the target person's state represented by the state information data. The physiological data may be raw data obtained from one or more sensors, or may be manipulated data that has undergone information processing. The physiological data may be selected to include higher-order information about the human state than the state information data. The physiological parameter may be, for example, a brain activity (e.g., brain waves or a brain blood flow), an eye movement (e.g., a pupil diameter or a gaze direction), a myogenic potential, a cardiac potential, a blood pressure, a pulse, a heartbeat, a body temperature, a galvanic skin reflex (GSR), or any combination of these items. The sensor may be, for example, an electroencephalograph (EEG), a magnetoencephalograph (MEG), a magnetic resonance imaging (MRI) system, a camera, an electrooculography (EOG) sensor, an ophthalmograph, an electromyograph (EMG), an electrocardiograph, a blood pressure meter, a pulsimeter, a cardiotachometer, a clinical thermometer, a GSR meter, or any combination of these sensors. The camera may include, for example, a typical camera (e.g., a camera to capture RGB images), a depth camera (e.g., a range camera or a stereo camera) that can obtain depth images, or a thermocamera (e.g., an infrared camera) that can obtain thermograms. The ophthalmograph measures the eye movement such as changes in the pupil diameter or the gaze direction. The eye movement to be measured with the ophthalmograph may be either a voluntary movement or an involuntary movement. The ophthalmograph may be, for example, a pupillometer or an eye tracker. The pupillometer measures the target person's pupil diameter (or its changes over time). The eye tracker measures the target person's gaze direction (or its changes over time). Each learning dataset may be referred to as a learning sample. Each piece of face image data may be referred to as learning data or input data. Each of the first state information data and the first physiological data may be referred to as answer data or training data. Each estimator is constructed using a learning model with machine learning. Each estimator may be referred to as a learner.

In the estimator generation apparatus according to the above aspect, the first face image data and the first state information data included in each of the plurality of first learning datasets may be collected in a real environment. The second face image data and the first physiological data included in each of the plurality of second learning datasets may be collected in an experimental environment.

The real environment refers to an environment in which the trained estimator (first estimator) is actually used or an environment equivalent to such an environment. The real environment is, for example, a space in a vehicle or a space in a structure simulating a vehicle. The experimental environment refers to any environment other than the real environment, such as a laboratory. In the experimental environment, higher-performance sensors can be used to collect higher-order information indicating the human state than in the real environment. However, in the real environment, such higher-performance sensors may be difficult to use or may cost too much.

For example, measurement data about the cerebral blood flow may be obtained as the physiological data to estimate the drowsiness level indicating the level of drowsiness of the target person as the target person's state. In this case, an MRI system as the sensor for collecting the physiological data is used to capture the blood flow associated with the brain activity with functional magnetic resonance imaging (fMRI). The MRI system can obtain the physiological data that can estimate the target person's state (drowsiness level) more accurately. However, the MRI system is large-scale and difficult to use in the real environment (e.g., in a vehicle).

In the above structure, the first learning datasets to be used in machine learning on the first estimator are collected in the real environment, and the second learning datasets to be used in machine learning on the second estimator are collected in the experimental environment. This allows collection of the first physiological data that can include higher-order information indicating the subject's state. Using the first physiological data for machine learning, the common encoder has its parameters converging toward higher-accuracy local solutions for determining the target person's state from face image data that is easily obtainable in the real environment. The estimator generated in the above structure can thus estimate the target person's state more accurately from data easily obtainable in the real environment, thus lowering the operational cost of the estimator in the real environment.

In the estimator generation apparatus according to the above aspect, the physiological parameter may include at least one selected from the group consisting of a brain activity, a myogenic potential, a cardiac potential, and an eye movement (in particular, a pupillometer). The first physiological data obtained in the above structure can include higher-order information indicating the subject's state. Thus, the common encoder has its parameters converging toward higher-accuracy local solutions for determining the first state information data. Thus, the estimator generated in the above structure can estimate the target person's state more accurately. The physiological data may be measured using, for example, an EEG, an MEG, an MRI system for capturing the blood flow associated with the brain activity with fMRI, an electromyograph, an electrocardiograph, an EOG sensor, or an ophthalmograph (in particular, a pupillometer).

In the estimator generation apparatus according to the above aspect, the first state information data may include the state of the subject including at least one selected from the group consisting of a drowsiness level indicating a level of drowsiness of the subject, a fatigue level indicating a level of fatigue of the subject, and a capacity level indicating a level of capacity of the subject for driving. The estimator generated in the above structure can estimate the drowsiness level, the fatigue level, the capacity level, or any combination of these items more accurately.

In the estimator generation apparatus according to the above aspect, the learning data obtainer may further obtain a plurality of third learning datasets each including a combination of third face image data including the face of the subject and second physiological data about the subject different from the first physiological data. The learning processor may further construct a third estimator by performing machine learning on the third estimator, and the machine learning on the first estimator and the machine learning on the second estimator. The third estimator may include the encoder in the first estimator and another decoder different from the decoder in the second estimator. The other decoder may be connected to the encoder to receive an output from the encoder. The third estimator may be trained to output, in response to the encoder receiving an input of the third face image data included in a third learning dataset of the plurality of third learning datasets, output data reconstructed from the second physiological data associated with the input third face image data from the other decoder. In the above structure, the common encoder has the output designed to further determine the second physiological data in the process of machine learning on the third estimator. This allows generation of the estimator that can estimate the target person's state more accurately. The second physiological data to be used in machine learning on the third estimator may be obtained by measuring the same physiological parameter as that for the first physiological data. Multiple third estimators may be included.

In the estimator generation apparatus according to the above aspect, the learning data obtainer may further obtain a plurality of fourth learning datasets each including a combination of third physiological data about the subject and second state information data representing a state of the subject. The learning processor may construct a fourth estimator by performing machine learning on the fourth estimator, and the machine learning on the first estimator and the machine learning on the second estimator. The fourth estimator may include another encoder different from the encoder in the first estimator and the estimation unit in the first estimator. The estimation unit may be connected to the other encoder to receive an output from the other encoder. The fourth estimator may be trained to output, in response to the other encoder receiving an input of the third physiological data included in a fourth learning dataset of the plurality of fourth learning datasets, an output value corresponding to the state of the subject represented by the second state information data associated with the input third physiological data from the estimation unit. During the machine learning, in response to the first state information data and the second state information data matching each other, the first estimator and the fourth estimator may be trained to reduce, to below a threshold, an error between the output value from the encoder receiving an input of the first face image data associated with the first state information data and the output value from the other encoder receiving an input of the third physiological data associated with the second state information data.

In the above structure, the fourth estimator is trained to determine the target person's state from physiological data. Using physiological data, more accurate estimation of the target person's state is expected than using face image data. Thus, the fourth estimator is expected to estimate the target person's state more accurately than the estimator that uses face image data to estimate the target person's state. In the above structure, the output from the other encoder in the fourth estimator is used as a sample for the output from the encoder in the first estimator for estimating the target person's state more accurately. In other words, the first estimator and the fourth estimator are trained in the process of machine learning to allow the error between the output from the encoder and the output from the other encoder to be below a threshold. Thus, the encoder in the first estimator has its parameters converging toward higher-accuracy local solutions for estimating the target person's state. The estimator generated in the above structure can thus estimate the target person's state more accurately.

A monitoring apparatus according to another aspect of the present invention includes a data obtainer that obtains face image data including a face of a target person driving a vehicle, an estimation processor that inputs the obtained face image data into the encoder in the first estimator constructed by the estimator generation apparatus according to any one of the above aspects, and obtains, from the estimation unit in the first estimator, an output corresponding to an estimated state of the target person, and an output unit that outputs information about the estimated state of the target person. The above structure allows accurate estimation of the target person's state.

The estimator generation apparatus and the monitoring apparatus according to the above embodiments may be used for any estimation of the state of a target person other than a driver, including estimating the state of a worker on a production line, as well as estimating the state of a vehicle driver. The estimator generation apparatus and the monitoring apparatus according to the above embodiments may further be used for any estimation of a target person's state from observation data obtained by observing the target person's activity, as well as estimating a target person's state from face image data including the target person. For example, the estimator generation apparatus and the monitoring apparatus according to the above embodiments may be used for estimating a target person' state from image data including the target person or estimating a target person's state from data other than image data.

For example, an estimator generation apparatus according to still another aspect of the present invention includes a learning data obtainer and a learning processor. The learning data obtainer obtains a plurality of first learning datasets each including a combination of first image data including a subject performing predetermined work and state information data representing a state of the subject during the predetermined work. The learning data obtainer obtains a plurality of second learning datasets each including a combination of second image data including the subject and physiological data obtained by measuring a physiological parameter about the subject with a sensor. The learning processor constructs a first estimator by performing machine learning on the first estimator. The first estimator includes an encoder and an estimation unit connected to the encoder to receive an output from the encoder. The first estimator is trained to output, in response to the encoder receiving an input of the first image data included in a first learning dataset of the plurality of first learning datasets, an output value corresponding to the state of the subject represented by the state information data associated with the input first image data from the estimation unit. The learning processor constructs a second estimator by performing machine learning on the second estimator. The second estimator includes the encoder in the first estimator and a decoder connected to the encoder to receive an output from the encoder. The second estimator is trained to output, in response to the encoder receiving an input of the second image data included in a second learning dataset of the plurality of second learning datasets, output data reconstructed from the physiological data associated with the input second image data from the decoder. The predetermined work may be vehicle driving or work on the production line.

For example, an estimator generation apparatus according to still another aspect of the present invention includes a learning data obtainer and a learning processor. The learning data obtainer obtains a plurality of first learning datasets each including a combination of first observation data obtained by measuring an activity of a subject performing predetermined work with a first sensor and state information data representing a state of the subject during the predetermined work. The learning data obtainer obtains a plurality of second learning datasets each including a combination of second observation data obtained by measuring an activity of the subject with the first sensor and physiological data obtained by measuring a physiological parameter about the subject with a second sensor different from the first sensor. The learning processor constructs a first estimator by performing machine learning on the first estimator. The first estimator includes an encoder and an estimation unit connected to the encoder to receive an output from the encoder. The first estimator is trained to output, in response to the encoder receiving an input of the first observation data included in a first learning dataset of the plurality of first learning datasets, an output value corresponding to the state of the subject represented by the state information data associated with the input first observation data from the estimation unit. The learning processor constructs a second estimator by performing machine learning on the second estimator. The second estimator includes the encoder in the first estimator and a decoder connected to the encoder to receive an output from the encoder. The second estimator is trained to output, in response to the encoder receiving an input of the second observation data included in a second learning dataset of the plurality of second learning datasets, output data reconstructed from the physiological data associated with the input second observation data from the decoder.

The first sensor and the second sensor may be any sensors selected as appropriate for each embodiment. The second sensor may have higher performance and obtain higher-order information about the human state than the first sensor. The first sensor may be less expensive than the second sensor. One of two types of data, or first data and second data, that includes higher-order information can be determined with, for example, the method described below. Learning samples including combinations of the first data, the second data, and a subject are prepared. The learning samples are used for machine learning to construct a first learning model trained to determine the subject's state from the first data, and a second learning model trained to determine the subject's state from the second data. Then, evaluation samples including combinations of the first data, the second data, and the target person's state (answer) are prepared. The trained first learning model is used to estimate the target person's state from the first data in the evaluation samples. The trained second learning model is used to estimate the target person's state from the second data in the evaluation samples. The accuracy in estimation with each learning model is then evaluated. In response to the first learning model evaluated to have the higher determination accuracy than the second learning model, the first data is determined to include higher-order information than the second data. In response to the second learning model evaluated to have the higher determination accuracy than the first learning model, the second data is determined to include higher-order information than the first data.

In the estimator generation apparatus according to the above aspect, the first observation data and the state information data included in each of the plurality of first learning datasets may be collected in a real environment. The second observation data and the physiological data included in each of the plurality of second learning datasets may be collected in an experimental environment. The estimator generated in the above structure can estimate the target person's state more accurately from data easily obtainable in the real environment, thus lowering the operational cost of the estimator in the real environment.

In the estimator generation apparatus according to the above aspect, the first sensor may include at least one selected from the group consisting of a camera, an electrooculography sensor, an eye tracker, a microphone, a blood pressure meter, a pulsimeter, a cardiotachometer, a clinical thermometer, a galvanic skin reflex meter, a load sensor, and an operational device. The second sensor may include at least one selected from the group consisting of an electroencephalograph, a magnetoencephalograph, a magnetic resonance imaging system, an electromyograph, an electrocardiograph, and a pupillometer. The estimator generated in the above structure can estimate the target person's state more accurately from data easily obtainable in the real environment, thus lowering the operational cost of the estimator in the real environment. The load sensor may measure the load at one point or measure the distribution of load. The operational device may be selected as appropriate for each embodiment to be operable by the target person to undergo state estimation. When the target person is a vehicle driver, the operational device may be, for example, a steering wheel, a brake, or an accelerator. The observation data obtained with the first sensor includes, for example, image data, EOG data, gaze measurement data, voice data, blood pressure data, pulse data, heart rate data, body temperature data, GSR data, load measurement data, operational logs, or any combination of these items. The operational logs indicate the operational histories of the operational device.

As another embodiment of each of the estimator generation apparatus and the monitoring apparatus according to the above embodiments, an aspect of the present invention may be directed to an image processing method for implementing the above features, a program, or a storage medium storing the program readable by, for example, a computer. The storage medium readable by, for example, a computer includes a medium storing a program or other information in an electrical, magnetic, optical, mechanical, or chemical manner. An estimation system according to an aspect of the present invention may include the estimator generation apparatus and the monitoring apparatus according to any one of the above embodiments.

For example, an estimator generation method according to still another aspect of the present invention is implementable by a computer. The estimator generation method includes obtaining a plurality of first learning datasets each including a combination of first face image data including a face of a subject driving a vehicle and state information data representing a state of the subject during driving of the vehicle, obtaining a plurality of second learning datasets each including a combination of second face image data including the face of the subject and physiological data obtained by measuring a physiological parameter about the subject with a sensor, and constructing a first estimator by performing machine learning on the first estimator and constructing a second estimator by performing machine learning on the second estimator. The first estimator includes an encoder and an estimation unit connected to the encoder to receive an output from the encoder. The first estimator is trained to output, in response to the encoder receiving an input of the first face image data included in a first learning dataset of the plurality of first learning datasets, an output value corresponding to the state of the subject represented by the state information data associated with the input first face image data from the estimation unit. The second estimator includes the encoder in the first estimator and a decoder connected to the encoder to receive an output from the encoder. The second estimator is trained to output, in response to the encoder receiving an input of the second face image data included in a second learning dataset of the plurality of second learning datasets, output data reconstructed from the physiological data associated with the input second face image data from the decoder.

For example, an estimator generation program according to still another aspect of the present invention is an estimator generation program for causing a computer to perform operations including obtaining a plurality of first learning datasets each including a combination of first face image data including a face of a subject driving a vehicle and state information data representing a state of the subject during driving of the vehicle, obtaining a plurality of second learning datasets each including a combination of second face image data including the face of the subject and physiological data obtained by measuring a physiological parameter about the subject with a sensor, and constructing a first estimator by performing machine learning on the first estimator and constructing a second estimator by performing machine learning on the second estimator. The first estimator includes an encoder and an estimation unit connected to the encoder to receive an output from the encoder. The first estimator is trained to output, in response to the encoder receiving an input of the first face image data included in a first learning dataset of the plurality of first learning datasets, an output value corresponding to the state of the subject represented by the state information data associated with the input first face image data from the estimation unit. The second estimator includes the encoder in the first estimator and a decoder connected to the encoder to receive an output from the encoder. The second estimator is trained to output, in response to the encoder receiving an input of the second face image data included in a second learning dataset of the plurality of second learning datasets, output data reconstructed from the physiological data associated with the input second face image data from the decoder.

Advantageous Effects

The technique according to the above aspects of the present invention allows generation of an estimator that can estimate the human state more accurately.

DETAILED DESCRIPTION

One or more embodiments of the present invention (hereafter, the present embodiment) will now be described with reference to the drawings. The present embodiment described below is a mere example of the present invention in any aspect. The embodiments may be variously modified or altered without departing from the scope of the present invention. More specifically, the present invention may be implemented as appropriate using the configuration specific to each embodiment. Although data used in the present embodiment is described in a natural language, such data may be specifically defined using any computer-readable language, such as a pseudo language, commands, parameters, or a machine language.

1. Example Use

Figure 1:
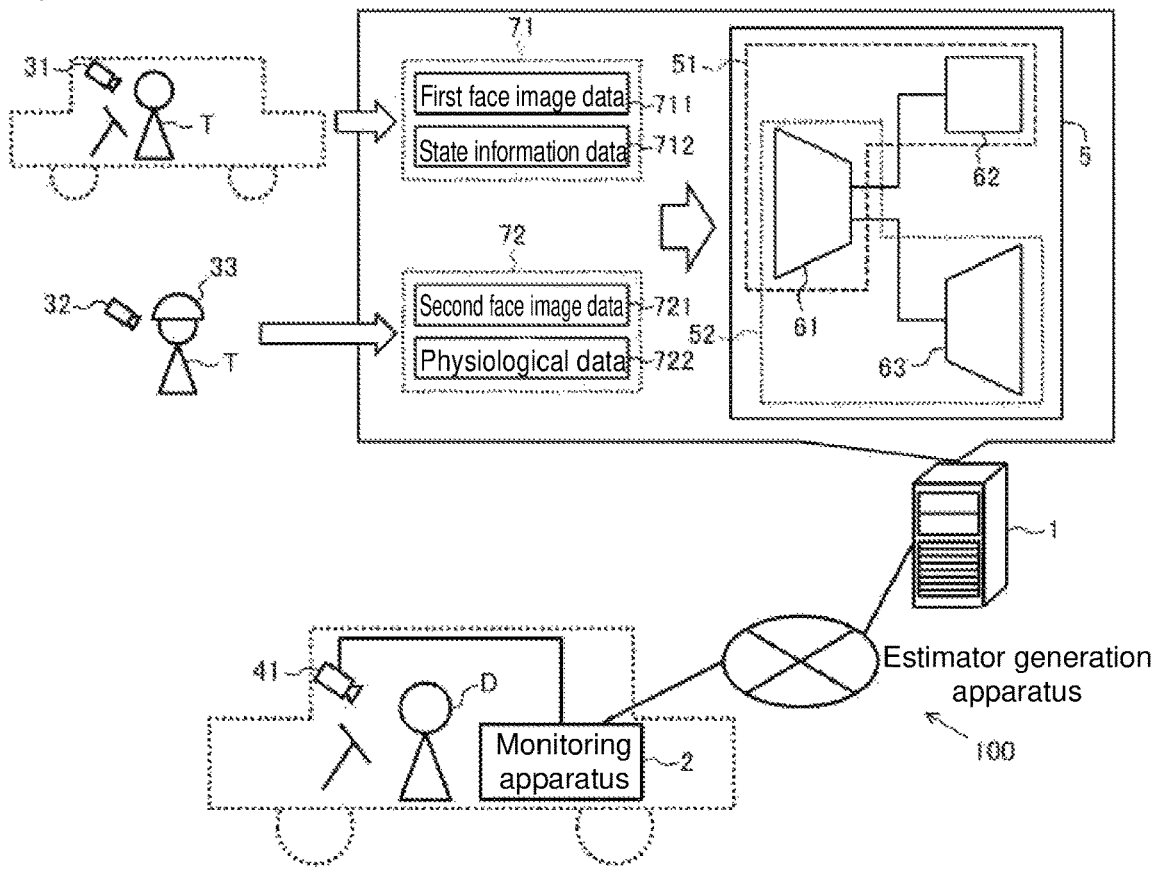
FIG. 1 is a schematic diagram scribing illustrating an example use of an estimation system according to one or more embodiments.

An example implementation of the present invention will now be described with reference to FIG. 1. FIG. 1 is a schematic diagram describing an example use of an estimation system 100 according to the present embodiment. FIG. 1 shows example determination of a vehicle driver state from face image data. The vehicle driving is an example of the predetermined work in an aspect of the present invention. The face image data is an example of the image data and the observation data in an aspect of the present invention. However, the present invention is not limited to such implementations. The present invention may be implemented widely in estimating the target person's state from observation data.

As shown in FIG. 1, the estimation system 100 according to the present embodiment includes an estimator generation apparatus 1 and a monitoring apparatus 2 connected together with a network. The estimation system 100 according to the present embodiment thus generates an estimator for estimating the target person's state from face image data, and estimates the driver state from the generated estimator. The network connecting the estimator generation apparatus 1 and the monitoring apparatus 2 may be selected as appropriate from, for example, the Internet, a wireless communication network, a mobile communication network, a telephone network, and a dedicated network.

The estimator generation apparatus 1 according to the present embodiment is a computer that constructs, through machine learning, an estimator (first estimator 51) for estimating the target person's state from face image data. More specifically, the estimator generation apparatus 1 according to the present embodiment first obtains multiple first learning datasets 71 and multiple second learning datasets 72.

Each first learning dataset 71 includes a combination of first face image data 711 including the face of a subject T driving a vehicle and state information data 712 representing the state of the subject T during driving of the vehicle. For example, the first face image data 711 may be obtained with a camera 31 located to capture the face of the subject T on the driver's seat in a space in the vehicle (real environment). The state information data 712 is an example of the first state information data in an aspect of the present invention. The target person's state to undergo machine learning may be, for example, the drowsiness level indicating the level of drowsiness, the fatigue level indicating the level of fatigue, the capacity level indicating the level of capacity for driving, or any combination of these items. The state information data 712 may accordingly represent, as the state of the subject T, the drowsiness level indicating the level of drowsiness of the subject T, the fatigue level indicating the level of fatigue of the subject T, the capacity level indicating the level of capacity of the subject T for driving, or any combination of these items, for example.

Each second learning dataset 72 includes a combination of second face image data 721 including the face of the subject T and physiological data 722 obtained by measuring a physiological parameter about the subject T with one or more sensors. For example, the second face image data 721 may be obtained with a camera 32 located to capture the face of the subject T in an experimental environment such as a laboratory. The physiological data 722 is an example of the first physiological data in an aspect of the present invention. The physiological data 722 may be obtained by, for example, measuring brain waves with an electroencephalograph (EEG) 33. The brain waves are an example of the physiological parameter in an aspect of the present invention. The EEG 33 is an example of the sensor in an aspect of the present invention. The types of the cameras 31 and 32 may be selected as appropriate for each embodiment. The cameras 31 and 32 may be, for example, typical cameras (e.g., digital cameras or video cameras), depth cameras (e.g., range cameras or stereo cameras) that can obtain depth images, or thermocameras (e.g., infrared cameras) that can obtain thermograms.

The estimator generation apparatus 1 according to the present embodiment then performs machine learning on a learning network 5 using the obtained multiple first learning datasets 71 and the obtained multiple second learning datasets 72. The learning network 5 in the present embodiment includes a first estimator 51 and a second estimator 52. The first estimator 51 includes an encoder 61 and an estimation unit 62. The estimation unit 62 is connected to the encoder 61 to receive an output from the encoder 61. The second estimator 52 includes the encoder 61 in the first estimator 51 and a decoder 63. In other words, the first estimator 51 and the second estimator 52 share the common encoder 61 in the present embodiment. The decoder 63 is connected to the encoder 61 to receive an output from the encoder 61.

The estimator generation apparatus 1 according to the present embodiment performs machine learning on the first estimator 51 using the multiple first learning datasets 71. Thus, the estimator generation apparatus 1 constructs the first estimator 51 trained to output, in response to the encoder 61 receiving an input of first face image data 711 included in a first learning dataset 71, an output value corresponding to the state of the subject T represented by the state information data 712 associated with the input first face image data 711, from the estimation unit 62. The estimator generation apparatus 1 according to the present embodiment performs machine learning on the second estimator 52 using the multiple second learning datasets 72. Thus, the estimator generation apparatus 1 constructs the second estimator 52 trained to output, in response to the encoder 61 receiving an input of second face image data 721 included in a second learning dataset 72, output data reconstructed from the physiological data 722 associated with the input second face image data 721, from the decoder 63. The machine learning allows an estimator (first estimator 51) to be generated for estimating the target person's state from face image data.

The monitoring apparatus 2 according to the present embodiment is a computer that estimates the state of a driver D driving a vehicle from face image data using the trained estimator (first estimator 51) generated by the estimator generation apparatus 1. More specifically, the monitoring apparatus 2 first obtains face image data including the face of the driver D driving the vehicle. The driver D is an example of the target person in an aspect of the present invention. For example, the face image data may be obtained with a camera 41 located to capture the face of the driver D on the driver's seat.

The monitoring apparatus 2 according to the present embodiment then inputs the obtained face image data into the encoder 61 in the first estimator 51 constructed by the estimator generation apparatus 1 to obtain, from the estimation unit 62 in the first estimator 51, an output corresponding to the estimated state of the driver D. The monitoring apparatus 2 thus estimates the state of the driver D. The monitoring apparatus 2 then outputs information about the estimated state of the driver D.

The first estimator 51 and the second estimator 52 thus share the common encoder 61 in the present embodiment. The first estimator 51 is trained to estimate the target person's state from face image data through machine learning using the multiple first learning datasets 71. The second estimator 52 is trained to reconstruct the physiological phenomenon of the target person from face image data through machine learning using the multiple second learning datasets 72. Thus, the common encoder 61 has the output (feature quantity) designed to determine the target person's state and the physiological phenomenon from face image data through machine learning on the estimators 51 and 52.

The physiological data 722 can include higher-order information about the human state than the state information data 712. For example, the physiological data 722 obtained by the EEG 33 may include information about the human brain activity. In contrast, the state information data 712 represents the human state of the drowsiness level, the fatigue level, the capacity level, or any combination of these items. Information about the human brain activity can determine the drowsiness level, the fatigue level, and the capacity level, and other human states. Thus, the physiological data 722 includes higher-order information about the human state than the state information data 712.

The common encoder 61 is trained to determine the physiological data 722 that can include higher-order information in addition to the state information data 712. The common encoder 61 thus has its parameters converging toward higher-accuracy local solutions for determining the state information data 712 (or in other words, for estimating the target person's state). The estimator generation apparatus 1 according to the present embodiment thus generates the estimator (first estimator 51) that can estimate the target person's state more accurately.

With sufficient numbers of both first learning datasets 71 and second learning datasets 72 being available, the common encoder 61 can be appropriately trained to output the feature quantity that can determine both the human state and the physiological phenomenon. With an insufficient number of at least either first learning datasets 71 or second learning datasets 72 being available, the other can supply learning samples to be used in machine learning. Thus, the estimator generated in the present embodiment can estimate the target person's state more accurately without greatly increasing the cost for collecting learning samples. The monitoring apparatus 2 according to the present embodiment can use the first estimator 51 to estimate the state of the driver D accurately.

In the example shown in FIG. 1, the estimator generation apparatus 1 and the monitoring apparatus 2 are separate computers. However, the estimation system 100 may have any other configuration. The estimator generation apparatus 1 and the monitoring apparatus 2 may be incorporated in a single computer. In some embodiments, the estimator generation apparatus 1 and the monitoring apparatus 2 each may be formed from multiple computers. In some embodiments, the estimator generation apparatus 1 and the monitoring apparatus 2 may not be connected to a network. In this case, the estimator generation apparatus 1 and the monitoring apparatus 2 may exchange data with each other through a storage medium such as a nonvolatile memory.

2. Example Configuration

Hardware Configuration
Estimator Generation Apparatus

Figure 2:
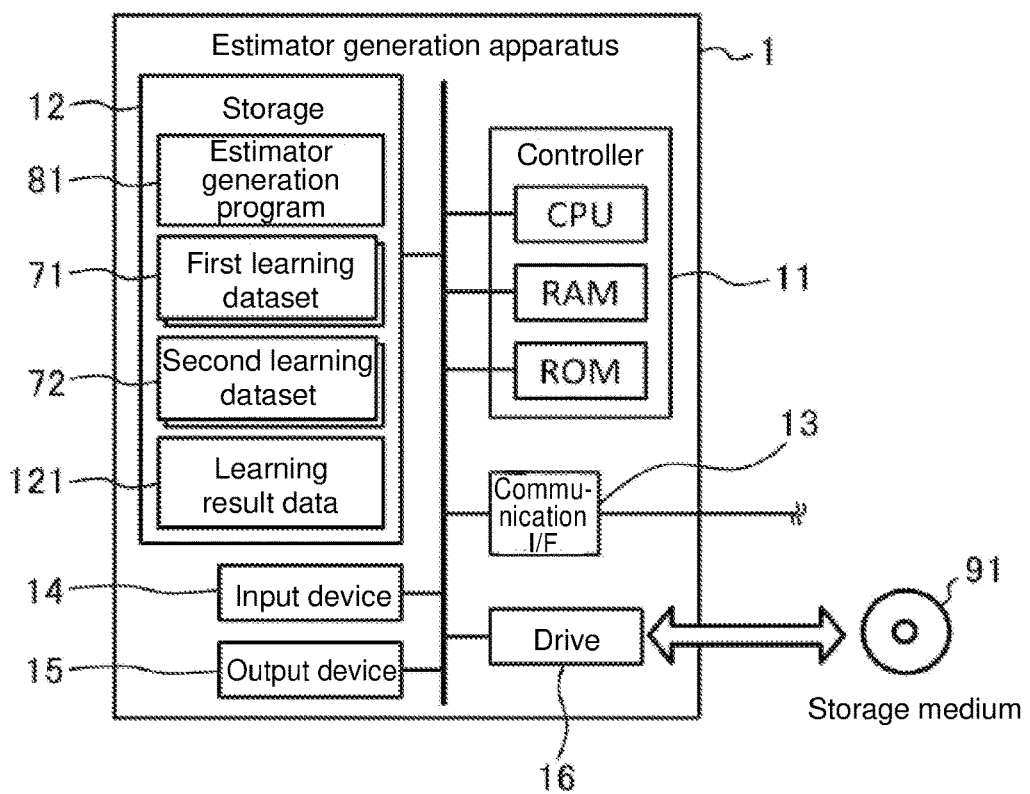
FIG. 2 is a schematic diagram illustrating an estimator generation apparatus according to an embodiment showing its example hardware configuration.

An example hardware configuration of the estimator generation apparatus 1 according to the present embodiment will now be described with reference to FIG. 2. FIG. 2 is a schematic diagram of the estimator generation apparatus 1 according to the present embodiment showing its example hardware configuration.

As shown in FIG. 2, the estimator generation apparatus 1 according to the present embodiment is a computer including a controller 11, a storage 12, a communication interface 13, an input device 14, an output device 15, and a drive 16 that are electrically connected to one another. In FIG. 2, the communication interface is abbreviated as a communication I/F.

The controller 11 includes, for example, a central processing unit (CPU) as a hardware processor, a random-access memory (RAM), and a read-only memory (ROM). The controller 11 performs information processing based on a program and various items of data. The storage 12 is an example of the memory and includes, for example, a hard disk drive or a solid state drive. In the present embodiment, the storage 12 stores various items of information including an estimator generation program 81, the multiple first learning datasets 71, the multiple second learning datasets 72, and learning result data 121.

The estimator generation program 81 causes the estimator generation apparatus 1 to perform information processing for machine learning (described later with reference to FIG. 6) and construct a trained estimator (first estimator 51) for estimating the target person's state from face image data. The estimator generation program 81 includes a series of instructions for the information processing. The multiple first learning datasets 71 and the multiple second learning datasets 72 are used for machine learning. The learning result data 121 is used for setting the trained estimator (first estimator 51) constructed through machine learning. The learning result data 121 results from the execution of the estimator generation program 81. This will be described in detail later.

The communication interface 13 is, for example, a wired local area network (LAN) module or a wireless LAN module for wired or wireless communication through a network. The estimator generation apparatus 1 uses the communication interface 13 for data communication with other information processing apparatuses (e.g., the monitoring apparatus 2) through a network.

The input device 14 is, for example, a mouse or a keyboard. The output device 15 is, for example, a display and a speaker. An operator can operate the estimator generation apparatus 1 through the input device 14 and the output device 15.

The drive 16 is, for example, a compact disc (CD) drive or a digital versatile disc (DVD) drive for reading a program stored in a storage medium 91. The type of drive 16 may be selected as appropriate depending on the type of storage medium 91. At least any of the estimator generation program 81, the multiple first learning datasets 71, or the multiple second learning datasets 72 may be stored in the storage medium 91.

The storage medium 91 stores programs or other information in an electrical, magnetic, optical, mechanical, or chemical manner to allow a computer or another device or machine to read the recorded programs or other information. The estimator generation apparatus 1 may obtain, from the storage medium 91, at least any of the estimator generation program 81, the multiple first learning datasets 71, or the multiple second learning datasets 72.

In FIG. 2, the storage medium 91 is a disc-type storage medium, such as a CD or a DVD. However, the storage medium 91 is not limited to a disc. One example of the storage medium other than a disc is a semiconductor memory such as a flash memory.

For the specific hardware configuration of the estimator generation apparatus 1, components may be eliminated, substituted, or added as appropriate for each embodiment. For example, the controller 11 may include multiple hardware processors. The hardware processors may be a microprocessor, a field-programmable gate array (FPGA), a digital signal processor (DSP), and other processors. The storage 12 may be the RAM and the ROM included in the controller 11. At least any of the communication interface 13, the input device 14, the output device 15, or the drive 16 may be eliminated. The estimator generation apparatus 1 may further include an external interface for connection to the cameras 31 and 32 and the EEG 33. This external interface may have the same structure as an external interface 24 in the monitoring apparatus 2 (described later). The estimator generation apparatus 1 may be formed from multiple computers. In this case, each computer may have the same or a different hardware configuration. The estimator generation apparatus 1 may also be an information processing apparatus dedicated to an intended service, or may be a general-purpose server or a personal computer (PC).

Monitoring Apparatus

Figure 3:
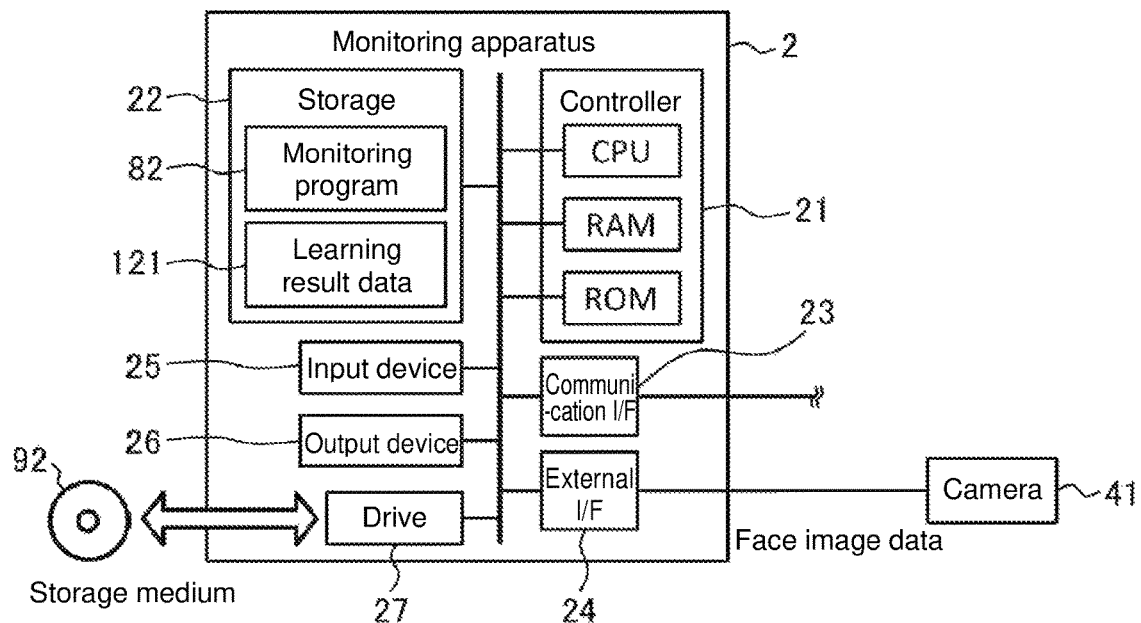
FIG. 3 is a schematic diagram illustrating a monitoring apparatus according to an embodiment showing its example hardware configuration.

An example hardware configuration of the monitoring apparatus 2 according to the present embodiment will now be described with reference to FIG. 3. FIG. 3 is a schematic diagram of the monitoring apparatus 2 according to the present embodiment showing its example hardware configuration.

As shown in FIG. 3, the monitoring apparatus 2 according to the present embodiment is a computer including a controller 21, a storage 22, a communication interface 23, the external interface 24, an input device 25, an output device 26, and a drive 27 that are electrically connected to one another. In FIG. 3, the communication interface and the external interface are abbreviated as a communication I/F and an external I/F.

The monitoring apparatus 2 may include the controller 21, the storage 22, the communication interface 23, the input device 25, the output device 26, and the drive 27 similar to the controller 11, the storage 12, the communication interface 13, the input device 14, the output device 15, and the drive 16 in the estimator generation apparatus 1. In other words, the controller 21 includes, for example, a CPU as a hardware processor, a RAM, and a ROM, and performs various information processing operations based on programs and data. The storage 22 includes, for example, a hard disk drive or a solid state drive. The storage 22 stores various items of information including a monitoring program 82 and the learning result data 121.

Figure 7:
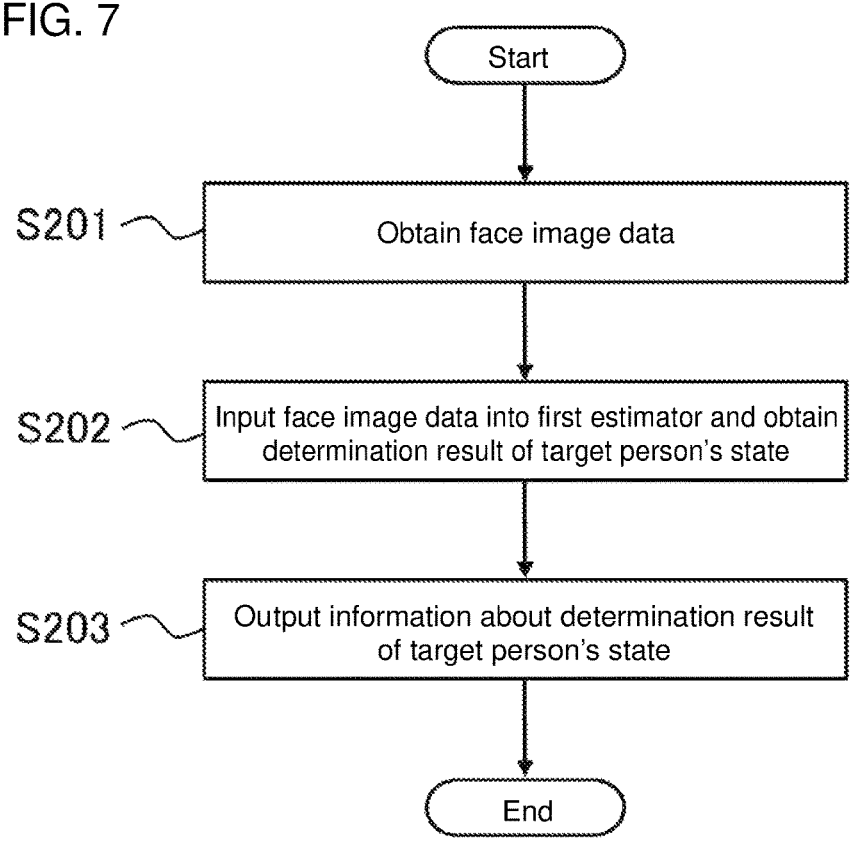
FIG. 7 is a flowchart illustrating an example procedure performed by a monitoring apparatus according to an embodiment.

The monitoring program 82 causes the monitoring apparatus 2 to perform information processing for monitoring the state of the driver D using the trained first estimator 51 (described later with reference to FIG. 7). The monitoring program 82 includes a series of instructions for the information processing. The learning result data 121 is used for setting the trained first estimator 51 during the information processing. This will be described in detail later.

The communication interface 23 is an interface for wired or wireless communication through a network, and may be a wired LAN module or a wireless LAN module. The monitoring apparatus 2 uses the communication interface 23 for data communication with other information processing apparatuses (e.g., the estimator generation apparatus 1) through a network.

The external interface 24 is an interface such as a universal serial bus (USB) port or a dedicated port for connection to external devices. Any type or any number of external interfaces 24 may be selected as appropriate in accordance with the type or number of external devices to be connected. In the present embodiment, the monitoring apparatus 2 is connected to the camera 41 through the external interface 24.

The camera 41 is used to capture the face of the driver D to produce face image data. The type and the location of the camera 41 may be determined as appropriate for each embodiment. For example, the camera 41 may be of the same type as the cameras 31 and 32 described above. The camera 41 may be located in the upper front of the driver's seat to have the imaging range including, for example, at least the upper body of the driver D. With the camera 41 including a communication interface, the monitoring apparatus 2 may be connected to the camera 41 through the communication interface 23, rather than through the external interface 24.

The input device 25 is, for example, a mouse or a keyboard. The output device 26 is, for example, a display or a speaker. An operator such as the driver D can operate the monitoring apparatus 2 through the input device 25 and the output device 26.

The drive 27 is, for example, a CD drive or a DVD drive for reading a program stored in a storage medium 92. At least either the monitoring program 82 or the learning result data 121 may be stored in the storage medium 92. The monitoring apparatus 2 may obtain, from the storage medium 92, at least either the monitoring program 82 or the learning result data 121.

For the specific hardware configuration of the monitoring apparatus 2, components may be eliminated, substituted, or added as appropriate for each embodiment as in the estimator generation apparatus 1. For example, the controller 21 may include multiple hardware processors. The hardware processors may be a microprocessor, an FPGA, a DSP, and other processors. The storage 22 may be the RAM and the ROM included in the controller 21. At least any of the communication interface 23, the external interface 24, the input device 25, the output device 26, or the drive 27 may be eliminated. The monitoring apparatus 2 may be formed from multiple computers. In this case, each computer may have the same or a different hardware configuration. The monitoring apparatus 2 may also be an information processing apparatus dedicated to an intended service, or may be a general-purpose server, a general-purpose desktop PC, a notebook PC, a tablet PC, or a mobile phone including a smartphone.

Software Configuration

Figure 4A:
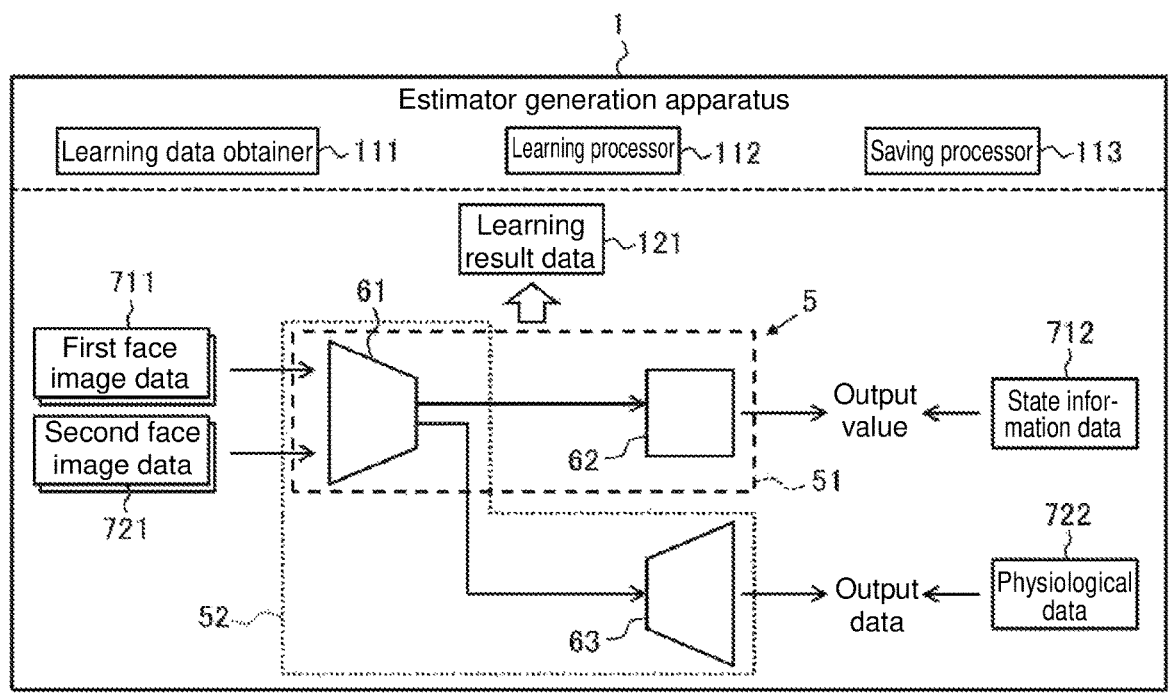
FIG. 4A is a schematic diagram illustrating an estimator generation apparatus according to an embodiment showing its example software configuration.

An example software configuration of the estimator generation apparatus 1 according to the present embodiment will now be described with reference to FIG. 4A. FIG. 4A is a schematic diagram of the estimator generation apparatus 1 according to the present embodiment showing its example software configuration.

The controller 11 in the estimator generation apparatus 1 loads the estimator generation program 81 stored in the storage 12 into the RAM. The CPU in the controller 11 then interprets and executes the estimator generation program 81 loaded in the RAM to control each unit. The estimator generation apparatus 1 according to the present embodiment thus operates as a computer including a learning data obtainer 111, a learning processor 112, and a saving processor 113 as software modules as shown in FIG. 4A. In other words, the estimator generation apparatus 1 in the present embodiment has its software modules implemented by the controller 11 (CPU).

The learning data obtainer 111 obtains the multiple first learning datasets 71 each including a combination of the first face image data 711 and the state information data 712. The first face image data 711 includes the face of the subject T driving a vehicle, and the state information data 712 represents the state of the subject T during driving of the vehicle. For example, the first face image data 711 may be obtained with the camera 31 located to capture the face of the subject T on the driver's seat in a space in the vehicle (real environment). The state information data 712 may represent, as the state of the subject T, the drowsiness level indicating the level of drowsiness of the subject T, the fatigue level indicating the level of fatigue of the subject T, the capacity level indicating the level of capacity of the subject T for driving, or any combination of these items, for example.

The learning data obtainer 111 obtains the multiple second learning datasets 72 each including a combination of the second face image data 721 and the physiological data 722. The second face image data 721 includes the face of the subject T, and the physiological data 722 is obtained by measuring a physiological parameter about the subject T with one or more sensors. For example, the second face image data 721 may be obtained with the camera 32 located to capture the face of the subject T in an experimental environment such as a laboratory. The physiological data 722 may be obtained by, for example, measuring brain waves with the EEG 33.

The learning processor 112 performs machine learning on the learning network 5 using the multiple first learning datasets 71 and the multiple second learning datasets 72. More specifically, the learning processor 112 performs machine learning on the first estimator 51 using the multiple first learning datasets 71, thus constructing the first estimator 51 trained to estimate the target person's state from face image data. The learning processor 112 also performs machine learning on the second estimator 52 using the multiple second learning datasets 72, thus constructing the second estimator 52 trained to reconstruct physiological data from face image data. The saving processor 113 saves information about the constructed trained first estimator 51 into the storage 12 as the learning result data 121.

For example, the estimation may be the determination of either discrete values (classes) with grouping (categorization or identification) or continuous values with regression. The state information data 712 may be in any format selected as appropriate to represent the state of the subject T. As described above, the state information data 712 may include, as the state of the subject T, the drowsiness level, the fatigue level, the capacity level, or any combination of such states of the subject T. The state information data 712 may be numerical data representing the drowsiness level, the fatigue level, and the capacity level expressed in continuous values. The state information data 712 may be numerical data representing the drowsiness level, the fatigue level, and the capacity level expressed in discrete values (representing, for example, classes).

Learning Network

Figure 4B:
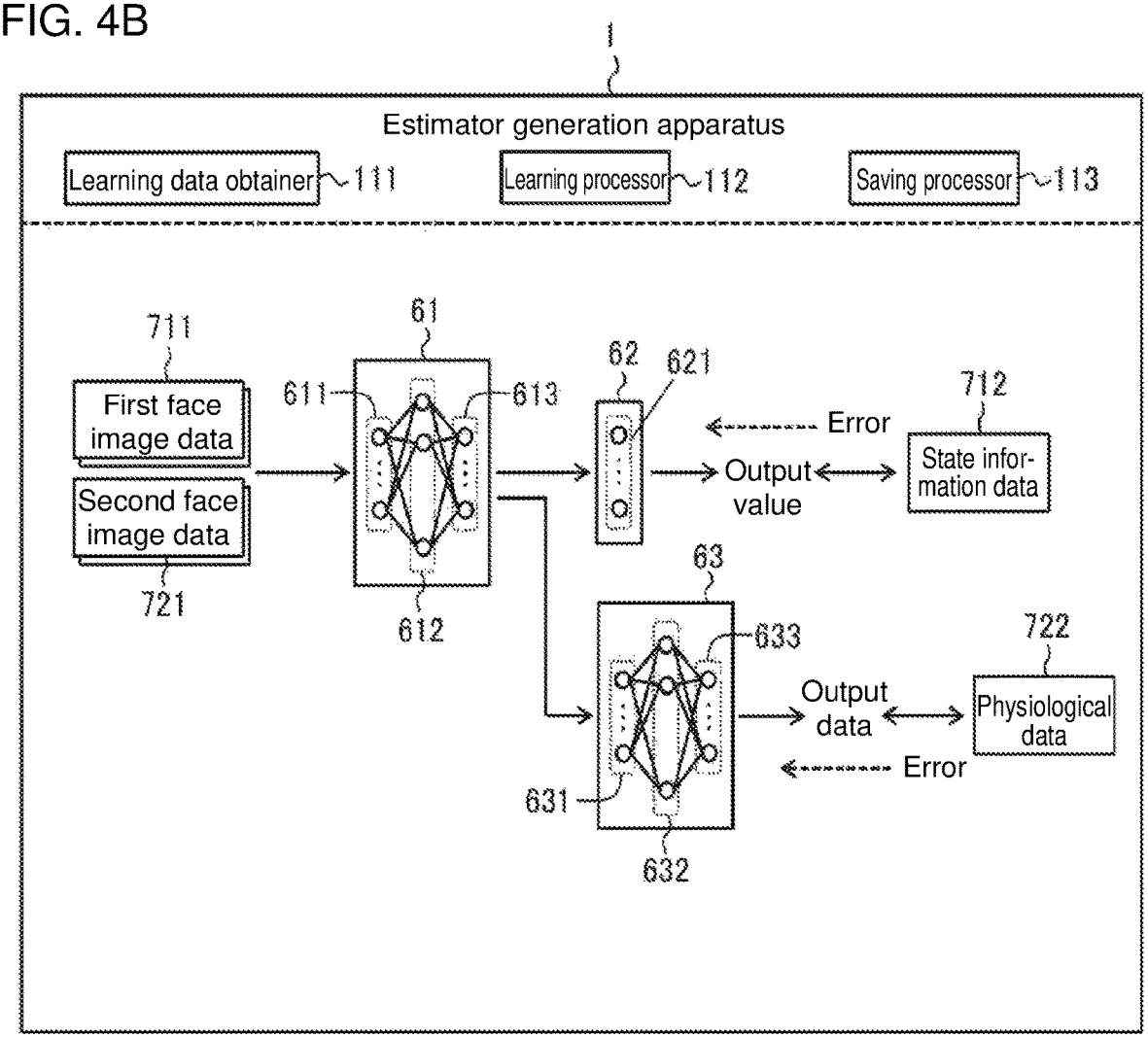
FIG. 4B is a schematic diagram illustrating an example process of machine learning on estimators in an embodiment.

An example structure of the learning network 5 will now be described with reference to FIG. 4B. As shown in FIGS. 4A and 4B, the learning network 5 in the present embodiment includes the encoder 61, the estimation unit 62, and the decoder 63. The encoder 61 determines the feature quantity from face image data. The estimation unit 62 determines the target person's state from the feature quantity. The decoder 63 reconstructs physiological data from the feature quantity. The estimation unit 62 is connected to the encoder 61 to receive an output from the encoder 61. The first estimator 51 includes the encoder 61 and the estimation unit 62. The decoder 63 is connected to the encoder 61 to receive an output from the encoder 61. The second estimator 52 includes the encoder 61 and the decoder 63. The encoder 61, the estimation unit 62, and the decoder 63 may be selected as appropriate for each embodiment to have any structure that uses a learning model with machine learning.

As shown in FIG. 4B, the encoder 61 in the present embodiment is constructed using a multilayer neural network used for deep learning, and includes an input layer 611, a middle layer (hidden layer) 612, and an output layer 613. The estimation unit 62 includes a fully connected layer 621. Similarly to the encoder 61, the decoder 63 is constructed using a multilayer neural network, and includes an input layer 631, a middle layer (hidden layer) 632, and an output layer 633.

In the example shown in FIG. 4B, the encoder 61 uses a neural network including one middle layer 612. However, the encoder 61 may have any other structure. The encoder 61 may include two or more middle layers 612, rather than one middle layer. The same applies to the decoder 63. The decoder 63 may include two or more middle layers 632, rather than one middle layer. The estimation unit 62 may also have any other structure. The estimation unit 62 may be constructed using a multilayer neural network.

Each of the layers 611 to 613, 621, and 631 to 633 includes one or more neurons (nodes). Each of the layers 611 to 613, 621, and 631 to 633 may include any number of neurons set as appropriate for each embodiment. For example, the number of neurons in the input layer 611 may be set in accordance with the number of pixels in input face image data. The number of neurons in the fully connected layer 621 may be set depending on, for example, the number of the target person's states to be estimated or the manner of expressing the states. The number of neurons in the output layer 633 may be set depending on the format for reconstructing physiological data.

Neurons in neighboring layers are connected to each other as appropriate. Each connection has a preset weight (connection weight). In the example shown in FIG. 4B, each neuron is connected to all the neurons in the adjacent layer. However, the neurons may have any other connection set as appropriate for each embodiment.

Each neuron has a preset threshold. An output of each neuron is determined basically depending on whether the sum of the product of each input and the corresponding weight exceeds the threshold. The neurons included in the layers 611 to 613 have thresholds and connection weights between neurons as example parameters of the encoder 61 to be used in arithmetic processing. The neurons included in the fully connected layer 621 have thresholds and connection weights between neurons as example parameters of the estimation unit 62. The neurons included in the layers 631 to 633 have thresholds and connection weights between neurons as example parameters of the decoder 63.

In machine learning on the first estimator 51, the learning processor 112 inputs, for each first learning dataset 71, the first face image data 711 into the input layer 611 in the encoder 61, and performs arithmetic processing in the first estimator 51 using the parameters of the encoder 61 and the estimation unit 62. Through the arithmetic processing, the learning processor 112 obtains, from the fully connected layer 621 in the estimation unit 62, an output value corresponding to the state of the target person (or the subject T in this case) estimated from the first face image data 711. The learning processor 112 then calculates the error between the obtained output value and the value corresponding to the state information data 712. The learning processor 112 then adjusts the parameter values of the first estimator 51 (the encoder 61 and the estimation unit 62) to reduce the sum of the calculated error. The learning processor 112 repeats adjusting the parameter values of the first estimator 51 until the sum of the error between the output value from the fully connected layer 621 and the value corresponding to the state information data 712 is equal to or below a threshold. Thus, the learning processor 112 constructs the first estimator 51 trained to output, in response to the encoder 61 receiving an input of first face image data 711 included in a first learning dataset 71, an output value corresponding to the state of the subject T represented by the state information data 712 associated with the input first face image data 711, from the estimation unit 62.

Similarly, in machine learning on the second estimator 52, the learning processor 112 inputs, for each second learning dataset 72, the second face image data 721 into the input layer 611 in the encoder 61, and performs arithmetic processing in the second estimator 52 using the parameters of the encoder 61 and the decoder 63. Through the arithmetic processing, the learning processor 112 obtains, from the output layer 633 in the decoder 63, output data corresponding to the result of reconstruction of physiological data about the target person (or the subject T in this case) from the second face image data 721. The learning processor 112 then calculates the error between the obtained output data and the physiological data 722. The learning processor 112 then adjusts the parameter values of the second estimator 52 (the encoder 61 and the decoder 63) to reduce the sum of the calculated error. The learning processor 112 repeats adjusting the parameter values of the second estimator 52 until the sum of the error between the output data from the output layer 633 and the physiological data 722 is equal to or below a threshold. Thus, the learning processor 112 constructs the second estimator 52 trained to output, in response to the encoder 61 receiving an input of second face image data 721 included in a second learning dataset 72, output data reconstructed from the physiological data 722 associated with the input second face image data 721, from the decoder 63.

Once the machine learning is complete, the saving processor 113 generates the learning result data 121 representing the structure of the constructed trained first estimator 51 (e.g., the number of layers in the neural network, the number of neurons in each layer, the connections between neurons, and the transfer function of each neuron), and representing the arithmetic parameters (e.g., the connection weights between neurons, and thresholds for the neurons). The saving processor 113 then saves the generated learning result data 121 into the storage 12.

Monitoring Apparatus

Figure 5:
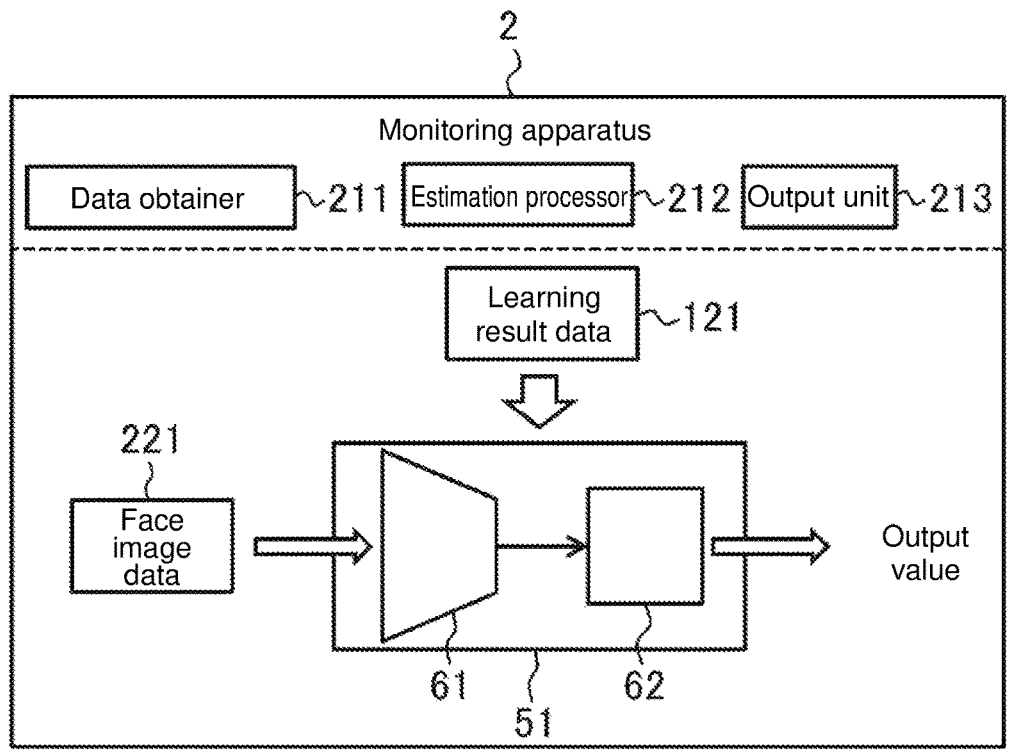
FIG. 5 is a schematic diagram illustrating a monitoring apparatus according to an embodiment showing its example software configuration.

An example software configuration of the monitoring apparatus 2 according to the present embodiment will now be described with reference to FIG. 5. FIG. 5 is a schematic diagram of the monitoring apparatus 2 according to the present embodiment showing its example software configuration.

The controller 21 in the monitoring apparatus 2 loads the monitoring program 82 stored in the storage 22 into the RAM. The CPU in the controller 21 then interprets and executes the monitoring program 82 loaded in the RAM to control each unit. The monitoring apparatus 2 according to the present embodiment thus operates as a computer including a data obtainer 211, an estimation processor 212, and an output unit 213 as software modules as shown in FIG. 5. In other words, the monitoring apparatus 2 in the present embodiment has its software modules implemented by the controller 21 (CPU), similarly to the estimator generation apparatus 1.

The data obtainer 211 obtains face image data 221 including the face of the driver D driving a vehicle. For example, the data obtainer 211 obtains the face image data 221 by capturing the face of the driver D with the camera 41. The estimation processor 212 holds the learning result data 121 to include the trained first estimator 51. The estimation processor 212 refers to the learning result data 121 to set the trained first estimator 51. The estimation processor 212 then inputs the obtained face image data 221 into the encoder 61 in the trained first estimator 51 to obtain, from the estimation unit 62 in the first estimator 51, an output corresponding to the estimated state of the driver D. The output unit 213 then outputs information about the estimated state of the driver D.

Others

Each software module in the estimator generation apparatus 1 and the monitoring apparatus 2 will be described in detail using the operation examples below. In the present embodiment, each software module in the estimator generation apparatus 1 and the monitoring apparatus 2 is implemented by a general-purpose CPU. However, some or all of the software modules may be implemented by one or more dedicated processors. For the software configurations of the estimator generation apparatus 1 and the monitoring apparatus 2, software modules may be eliminated, substituted, or added as appropriate for each embodiment.

3. Operation Examples

Estimator Generation Apparatus

Figure 6:
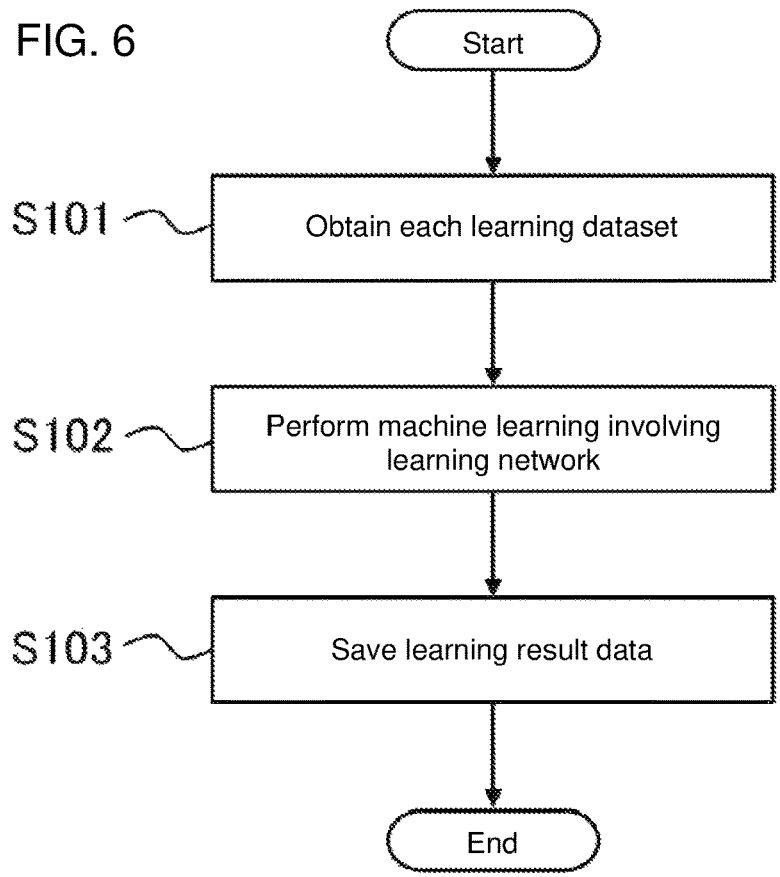
FIG. 6 is a flowchart illustrating an example procedure performed by an estimator generation apparatus according to an embodiment.

An example operation of the estimator generation apparatus 1 will now be described with reference to FIG. 6. FIG. 6 is a flowchart of an example procedure performed by the estimator generation apparatus 1 according to the present embodiment. The procedure described below is an example of the estimator generation method according to an aspect of the present invention. However, the procedure described below is a mere example, and each step may be modified in any possible manner. In the procedure described below, steps may be eliminated, substituted, or added as appropriate for each embodiment.

Step S101

In step S101, the controller 11 operates as the learning data obtainer 111 to obtain the multiple first learning datasets 71 each including a combination of the first face image data 711 and the state information data 712. The controller 11 also obtains the multiple second learning datasets 72 each including a combination of the second face image data 721 and the physiological data 722.

The multiple first learning datasets 71 may be obtained with any method selected as appropriate for each embodiment. For example, a vehicle or a structure simulating a vehicle incorporating the camera 31, and a subject T are prepared. The subject T driving the vehicle is captured with the camera 31 under various conditions to produce the first face image data 711 including the face of the subject T. Any number of vehicles or structures simulating vehicles and any number of subjects T may be prepared as appropriate for each embodiment. The obtained first face image data 711 is combined with the state information data 712 representing the state of the subject T to generate each first learning dataset 71.

The first face image data 711 may be in any data format selected as appropriate for each embodiment. The state information data 712 may be any representation of the state of the subject T. The state information data 712 may include, for example, the drowsiness level, the fatigue level, the capacity level, or any combination of such states of the subject T, as the state of the subject T. The first face image data 711 and the state information data 712 associated with each other as the first learning dataset 71 may not coincide in time. For example, the state information data 712 may represent the state of the subject T at the same time as when the face of the subject T is captured to produce the first face image data 711 (hereafter, a capturing time), or may represent the state of the subject T at a time different from (e.g., after) the capturing time of the first face image data 711. To precisely determine the state of the subject T from the first face image data 711, the first face image data 711 may have the capturing time related to the time of the state of the subject T represented by the state information data 712.

Similarly, the multiple second learning datasets 72 may be obtained with any method selected as appropriate for each embodiment. For example, the camera 32, the EEG 33, and the subject T are prepared. The subject T is captured with the camera 32 under various conditions, and the brain waves of the subject T are measured with the EEG 33. Any number of cameras 32, EEGs 33, and subjects T may be prepared as appropriate for each embodiment. The subject associated with generation of the first learning datasets 71 may be the same as or different from the subject associated with generation of the second learning datasets 72. The resulting second face image data 721 and the resulting physiological data 722 are combined together to generate each second learning dataset 72.

The second face image data 721 may be in any data format selected as appropriate for each embodiment. The physiological data 722 is not limited to measurement data about brain waves described above, and may be any data obtained by measuring, with one or more sensors, a physiological parameter that can be associated with the state of the subject T represented by the state information data 712. The physiological parameter may be, for example, a brain activity (e.g., brain waves or a brain blood flow), an eye movement (e.g., a pupil diameter or a gaze direction), a myogenic potential, a cardiac potential, a blood pressure, a pulse, a heartbeat, a body temperature, a galvanic skin reflex (GSR), or any combination of these items. The sensor may be, for example, an electroencephalograph (EEG), a magnetoencephalograph (MEG), a magnetic resonance imaging (MRI) system, a camera, an electrooculography (EOG) sensor, an ophthalmograph, an electromyograph (EMG), an electrocardiograph, a blood pressure meter, a pulsimeter, a cardiotachometer, a clinical thermometer, a GSR meter, or any combination of these sensors. The ophthalmograph measures the eye movement such as changes in the pupil diameter or the gaze direction. The eye movement to be measured with the ophthalmograph may be either a voluntary movement or an involuntary movement. The ophthalmograph may be, for example, a pupillometer or an eye tracker. The pupillometer has an appropriate structure to measure the target person's pupil diameter (or its changes over time). The eye tracker has an appropriate structure to measure the target person's gaze direction (or its changes over time). The physiological data 722 may be selected to include higher-order information about the human state than the state information data 712. The physiological data 722 may be raw data obtained from one or more sensors, or may be manipulated data that has undergone information processing. Similarly to the first learning dataset 71, the second face image data 721 and the physiological data 722 associated with each other as the second learning dataset 72 may not coincide in time.

The first face image data 711 and the first state information data 712 included in each first learning dataset 71 may be collected in a real environment. The real environment refers to an environment in which the trained first estimator 51 is actually used (e.g., an environment in which the monitoring apparatus 2 is used) or an environment equivalent to such an environment. The real environment is, for example, a space in a vehicle or a space in a structure simulating a vehicle. In other words, the first face image data 711 may be obtained in a vehicle or a structure simulating a vehicle incorporating the camera 31.

In contrast, the second face image data 721 and the physiological data 722 included in each second learning dataset 72 may be collected in an experimental environment. The experimental environment refers to any environment other than the real environment, such as a laboratory. The physiological data 722 may be obtained in the experimental environment to include higher-order information indicating the state of the subject T. In this case, the physiological parameter to be measured in the experimental environment may be a brain activity, a myogenic potential, a cardiac potential, an eye movement (in particular, a pupil diameter), or any combination of these items. The sensor used in the experimental environment may accordingly be an EEG, an MEG, an MRI system, an EMG, an electrocardiograph, an EOG sensor, an ophthalmograph (in particular, a pupillometer), or any combination of these sensors.

With the first face image data 711 and the second face image data 721 captured in different environments, a large difference may arise between the first face image data 711 and the second face image data 721 in any element (e.g., a sensor attached to the face) other than the face of the subject T. The difference may affect the accuracy of the estimator constructed through machine learning. Examples of such cases with different capturing environments include the first face image data 711 being collected in the real environment and the second face image data 721 being collected in the experimental environment as described above. In this case, the first face image data 711 and the second face image data 721 may be manipulated as appropriate to have any element other than the face indistinguishable between the data 711 and the data 721.

The manipulation can be performed with a generative model using, for example, a generative adversarial network (GAN). The GAN includes a generator and a discriminator. The generator generates images corresponding to learning samples (images) from noise. The discriminator is trained to determine whether given images are from learning samples or from the generator. In contrast, the generator is trained to generate images that would cause the discriminator's erroneous determination. With the discriminator and the generator repeatedly trained, the generator acquires the capability of generating images close to learning samples.

Thus, the GAN can be used to manipulate the first face image data 711 and the second face image data 721 as appropriate. For example, the first face image data 711 is used as a learning sample to construct a first GAN including a first generator for generating an image corresponding to the first face image data 711. Similarly, the second face image data 721 is used as a learning sample to construct a second GAN including a second generator for generating an image corresponding to the second face image data 721. The image generated by the first generator replaces the original first face image data 711 as new first face image data 711 having a manipulated image. The image generated by the second generator replaces the original second face image data 721 as new second face image data 721 having a manipulated image. Thus, the first face image data 711 and the second face image data 721 can be manipulated as appropriate to have any element other than the face indistinguishable between the data 711 and the data 721.

The first face image data 711 and the second face image data 721 may be manipulated with any other method. For example, the first face image data 711 and the second face image data 721 may be manipulated using any known filter such as a Gaussian filter, an average filter, or a median filter. In some embodiments, the first face image data 711 and the second face image data 721 may be manipulated with image processing by masking areas having any distinguishable element other than the face. The masking may be monochromatic noise or random noise. For example, a face area (e.g., a rectangular area) may be extracted from each of the first face image data 711 and the second face image data 721 to exclude any element other than the face, and each image of the extracted face area may be replaced with the corresponding new first face image data 711 or the corresponding new second face image data 721.

Each first learning dataset 71 and each second learning dataset 72 may be obtained in any other environment selected as appropriate for each embodiment. Each first learning dataset 71 and each second learning dataset 72 may be obtained in the same environment. In this case, the first face image data 711 and the second face image data 721 may be identical. Multiple learning datasets each including a combination of face image data, the state information data 712, and the physiological data 722 may be collected. Each first learning dataset 71 may be obtained by extracting face image data and the state information data 712 from a learning dataset. Each second learning dataset 72 may be obtained by extracting face image data and the physiological data 722 from a learning dataset.

Each first learning dataset 71 and each second learning dataset 72 described above may be generated automatically or manually. Each first learning dataset 71 and each second learning dataset 72 may be generated by the estimator generation apparatus 1. In some embodiments, at least either the first learning datasets 71 or the second learning datasets 72 may be generated by a computer other than the estimator generation apparatus 1.

When each first learning dataset 71 and each second learning dataset 72 are generated by the estimator generation apparatus 1, the controller 11 obtains the first face image data 711 and the second face image data 721 from the cameras 31 and 32 as appropriate. The controller 11 also receives an operator's input for specifying the state of the subject T through the input device 14, and generates the state information data 712 representing the specified state of the subject T. The controller 11 further obtains the physiological data 722 from the EEG 33 as appropriate. The controller 11 then combines the first face image data 711 with the state information data 712 to generate each first learning dataset 71. The controller 11 also combines the second face image data 721 with the physiological data 722 to generate each second learning dataset 72. In step S101, the controller 11 thus obtains the multiple first learning datasets 71 and the multiple second learning datasets 72.

When at least either the first learning datasets 71 or the second learning datasets 72 are generated by another computer, the generated learning datasets are transferred from the other computer to the estimator generation apparatus 1 as appropriate. In step S101, the controller 11 may obtain at least either the first learning datasets 71 or the second learning datasets 72 generated by the other computer through, for example, a network or the storage medium 91. The other computer may generate at least either the first learning datasets 71 or the second learning datasets 72 in the same manner as the estimator generation apparatus 1.

Any number of first learning datasets 71 and second learning datasets 72 may be obtained as appropriate for each embodiment. When obtaining the multiple first learning datasets 71 and the multiple second learning datasets 72, the controller 11 advances the processing to the next step S102.

Step S102

In step S102, the controller 11 operates as the learning processor 112 to perform machine learning on the learning network 5 using the multiple first learning datasets 71 and the multiple second learning datasets 72. More specifically, the controller 11 performs machine learning on the first estimator 51 using the multiple first learning datasets 71, thus constructing the first estimator 51 trained to estimate the state information data 712 from the first face image data 711. The controller 11 also performs machine learning on the second estimator 52 using the multiple second learning datasets 72, thus constructing the second estimator 52 trained to reconstruct the physiological data 722 from the second face image data 721.

More specifically, the controller 11 first prepares the learning network 5. The structure of the learning network 5 to be prepared, the default values of the connection weights between neurons, and the default thresholds for the neurons may be provided in the form of a template or may be input by an operator. For retraining, the controller 11 may prepare the learning network 5 based on the learning result data obtained through machine learning in the past.

The controller 11 then trains the first estimator 51 using the first face image data 711 included in each first learning dataset 71 obtained in step S101 as input data, and using the corresponding state information data 712 as training data. This training may use, for example, stochastic gradient descent.

For example, in the first step, the controller 11 inputs the first face image data 711 into the input layer 611 in the encoder 61 for each first learning dataset 71, and determines the presence or absence of firing in each neuron included in the layers 611 to 613 and 621 in the order from the input end. The controller 11 thus obtains, from the fully connected layer 621 in the estimation unit 62, an output value corresponding to the estimated state of the subject T represented by the state information data 712 from the first face image data 711. In the second step, the controller 11 calculates the error between the obtained output value and the value corresponding to the state information data 712. In the third step, the controller 11 calculates the error in each connection weight between neurons and the error in the threshold for each neuron using the calculated error in the output value with backpropagation. In the fourth step, the controller 11 updates each connection weight between neurons and also the threshold for each neuron based on the calculated errors.

The controller 11 repeats, for each first learning dataset 71, adjusting the parameter values of the first estimator 51 (the encoder 61 and the estimation unit 62) through the first to fourth steps until the sum of the error between the output value from the fully connected layer 621 and the value corresponding to the state information data 712 is equal to or below a threshold. The threshold may be set as appropriate for each embodiment. Thus, the controller 11 constructs the first estimator 51 trained to output, in response to the encoder 61 receiving an input of first face image data 711 included in a first learning dataset 71, an output value corresponding to the state of the subject T represented by the state information data 712 associated with the input first face image data 711, from the estimation unit 62.

Similarly, the controller 11 trains the second estimator 52 using the second face image data 721 included in each second learning dataset 72 obtained in step S101 as input data, and using the corresponding physiological data 722 as training data. The training may be similar to that for the first estimator 51. More specifically, the controller 11 performs the processing in the first to fourth steps on the layers 611 to 613 and 631 to 633 to be trained instead of the layers 611 to 613 and 621, using the second face image data 721 instead of the first face image data 711, and using the physiological data 722 instead of the state information data 712. The controller 11 repeats, for each second learning dataset 72, adjusting the parameter values of the second estimator 52 (the encoder 61 and the decoder 63) through the first to fourth steps until the sum of the error between the output data from the output layer 633 in the decoder 63 and the physiological data 722 is equal to or below a threshold. The threshold may be set as appropriate for each embodiment and may be the same as or different from the threshold for machine learning on the first estimator 51. Thus, the controller 11 constructs the second estimator 52 trained to output, in response to the encoder 61 receiving an input of second face image data 721 included in a second learning dataset 72, output data reconstructed from the physiological data 722 associated with the input second face image data 721, from the decoder 63.

The machine learning processes for the first estimator 51 and the second estimator 52 may be performed in any order determined as appropriate for each embodiment. The machine learning on the first estimator 51 may be performed before, simultaneously with, or after the machine learning on the second estimator 52. Upon completion of the machine learning on the first and second estimators 51 and 52, the controller 11 advances the processing to the next step S103.

When the state information data 712 representing the state of the subject T is collected at a time different from the capturing time of the corresponding first face image data 711 in step S101, the first estimator 51 is trained to estimate the target person's state at a time different from the capturing time of the face image data in step S102. The same applies to the second estimator 52. The temporal relationship between the first face image data 711 and the state information data 712 in each first learning dataset 71 may not be the same as the temporal relationship between the second face image data 721 and the physiological data 722 in each second learning dataset 72.

To train the second estimator 52 in a less complicated manner and prevent failure in convergence of the training caused by variations in learning data, the physiological data 722 for use as training data may be manipulated to be simplified. For example, the physiological data 722 may be manipulated to represent the gradient direction (or in other words, whether the value increases or decreases at the next sample point). In some embodiments, the physiological data 722 may be obtained by discretizing continuous values to have predetermined intervals on, for example, an integer or logarithmic scale or based on data distribution using, for example, clustering. Such discretizations may be applied to the obtained data or to the gradient.

Step S103

In step S103, the controller 11 operates as the saving processor 113 to generate, as the learning result data 121, information indicating the structure and the parameters of the first estimator 51 constructed through machine learning in step S102. The controller 11 then saves the generated learning result data 121 into the storage 12. The controller 11 then ends the processing in the operation example.

The learning result data 121 may be saved into a storage other than the storage 12. The controller 11 may store the learning result data 121 into a data server such as a network attached storage (NAS). The learning result data 121 may or may not include information indicating the structure and the parameters of the second estimator 52 (in particular, the decoder 63) constructed through machine learning.

The controller 11 may transfer the generated learning result data 121 to the monitoring apparatus 2 at any time after constructing the trained first estimator 51. The monitoring apparatus 2 may obtain the learning result data 121 by receiving the learning result data 121 transferred from the estimator generation apparatus 1 or by accessing the estimator generation apparatus 1 or a data server. The learning result data 121 may be incorporated in the monitoring apparatus 2.

The controller 11 may periodically perform the processing in steps S101 to S103 to periodically update the learning result data 121. Repeating the processing may involve, for example, changes, modifications, additions, or deletions in the first learning dataset 71 or the second learning dataset 72 as appropriate. The controller 11 may transfer the updated learning result data 121 to the monitoring apparatus 2 at every implementation of training to regularly update the learning result data 121 retained by the monitoring apparatus 2.

Monitoring Apparatus

An example operation of the monitoring apparatus 2 will now be described with reference to FIG. 7. FIG. 7 is a flowchart of an example procedure performed by the monitoring apparatus 2 according to the present embodiment. However, the procedure described below is a mere example, and each step may be modified in any possible manner. In the procedure described below, steps may be eliminated, substituted, or added as appropriate for each embodiment.

Step S201

In step S201, the controller 21 operates as the data obtainer 211 to obtain the face image data 221 including the face of the driver D driving a vehicle. In the present embodiment, the monitoring apparatus 2 is connected to the camera 41 through the external interface 24. The controller 21 thus obtains the face image data 221 from the camera 41. The face image data 221 may be moving image data or still image data. When obtaining the face image data 221, the controller 21 advances the processing to the next step S202.

The face image data 221 may be obtained through any path selected as appropriate for each embodiment. For example, the camera 41 may be connected to a computer other than the monitoring apparatus 2. In this case, the controller 21 may obtain the face image data 221 by receiving the face image data 221 transmitted from the other computer.

Step S202

In step S202, the controller 21 operates as the estimation processor 212 to set the trained first estimator 51. The controller 21 then inputs the obtained face image data 221 into the trained first estimator 51, and performs arithmetic processing in the first estimator 51. In other words, the controller 21 inputs the face image data 221 into the input layer 611 in the encoder 61 and determines the presence or absence of firing in each neuron included in the layers 611 to 613 and 621 in the order from the input end. The controller 21 thus obtains, from the fully connected layer 621 in the estimation unit 62, an output value corresponding to the estimated state of the driver D.

Thus, the controller 21 can estimate the state of the driver D from the obtained face image data 221 using the trained first estimator 51. When the state information data 712 used for the machine learning includes the drowsiness level, the fatigue level, the capacity level, or any combination of such states of the subject T as the state of the subject T, the controller 21 can estimate the drowsiness level, the fatigue level, the capacity level, or any combination of such states of the driver D. When estimating the state of the driver D, the controller 21 advances the processing to the next step S203.

Step S203

In step S203, the controller 21 operates as the output unit 213 to output information about the estimated state of the driver D. The destination and the details of the output information may be determined as appropriate for each embodiment. For example, the controller 21 may output the estimated state of the driver D obtained in step S202 to the output device 26 without any change.

In some embodiments, the controller 21 may perform, for example, information processing based on the estimated state of the driver D. The controller 21 may then output the result of the information processing. As an example of the information processing, when at least one of the drowsiness level or the fatigue level is estimated as the state of the driver D, the controller 21 may determine whether at least one of the drowsiness level or the fatigue level exceeds a threshold. The threshold may be set as appropriate. When at least one of the drowsiness level or the fatigue level exceeds the threshold, the controller 21 may output a warning through the output device 26 to prompt the driver D to park in, for example, a parking lot to take a rest.

As another example of the information processing, when the vehicle is capable of autonomous driving, the controller 21 may control the autonomous driving operation of the vehicle based on the estimated state of the driver D. For example, the vehicle may be switchable between an autonomous driving mode in which the vehicle traveling is controlled by a system and a manual driving mode in which the vehicle traveling is controlled with the driver D's steering.

In this case, in response to an instruction from the driver D or the system to switch from the autonomous driving mode to the manual driving mode while the vehicle is traveling in the autonomous driving mode, the controller 21 may determine whether the estimated capacity level of the driver D exceeds a threshold. When the capacity level of the driver D exceeds the threshold, the controller 21 may permit the switching from the autonomous driving mode to the manual driving mode. When the capacity level of the driver D is at or below the threshold, the controller 21 may maintain the traveling in the autonomous driving mode without permitting the switching from the autonomous driving mode to the manual driving mode.

In some embodiments, the controller 21 may determine whether at least one of the drowsiness level or the fatigue level exceeds a threshold while the vehicle is traveling in the manual driving mode. When at least one of the drowsiness level or the fatigue level exceeds the threshold, the controller 21 may transmit, to the vehicle system, an instruction for switching from the manual driving mode to the autonomous driving mode and parking in a safe place such as a parking lot. When at least one of the drowsiness level or the fatigue level does not exceed the threshold, the controller 21 may maintain the vehicle traveling in the manual driving mode.

In some embodiments, the controller 21 may determine whether the capacity level is at or below a threshold while the vehicle is traveling in the manual driving mode. When the capacity level is at or below the threshold, the controller 21 may transmit an instruction for deceleration to the vehicle system. When the capacity level is not at or below the threshold, the controller 21 may maintain the vehicle traveling with the driver D's operating.

When the information output is complete, the controller 21 ends the processing in the operation example. While the vehicle is traveling with the driver D on the driver's seat, the controller 21 may continuously repeat a series of processing in steps S201 to S203. The monitoring apparatus 2 can thus continuously monitor the state of the driver D.

Features

The first estimator 51 and the second estimator 52 thus share the common encoder 61 in the present embodiment. The estimator generation apparatus 1 according to the present embodiment performs machine learning in step S102 to train the first estimator 51 to determine the state information data 712 from the first face image data 711 and train the second estimator 52 to reconstruct the physiological data 722 from the second face image data 721. Thus, the encoder 61 has the output (feature quantity) designed to determine the target person's state and the physiological phenomenon from the face image data. The physiological data 722 can include higher-order information about the human state than the state information data 712. The common encoder 61 is trained through machine learning in step S102 to determine the physiological data 722 that can include higher-order information in addition to the state information data 712. The common encoder 61 thus has its parameters converging toward higher-accuracy local solutions for estimating the target person's state. The estimator generation apparatus 1 according to the present embodiment thus generates the first estimator 51 that can estimate the target person's state more accurately.

With sufficient numbers of both first learning datasets 71 and second learning datasets 72 being available, the common encoder 61 can be appropriately trained to output the feature quantity that can determine both the human state and the physiological phenomenon. With an insufficient number of at least either first learning datasets 71 or second learning datasets 72 being available, the other can supply learning samples to be used in machine learning. In other words, in step S101, either the first learning datasets 71 or the second learning datasets 72 can be increased in number to compensate for the lack of the other. Thus, the first estimator 51 generated in the present embodiment can estimate the target person's state more accurately without greatly increasing the cost for collecting learning samples. The monitoring apparatus 2 according to the present embodiment can use the first estimator 51 to estimate the state of the driver D accurately.

In the experimental environment, higher-performance sensors can be used to collect higher-order information indicating the human state than in the real environment. However, in the real environment, such higher-performance sensors may be difficult to use or may cost too much. In the present embodiment, each first learning dataset 71 obtained in step S101 may be collected in the real environment, and each second learning dataset 72 may be collected in the experimental environment. This allows collection of the physiological data 722 that can include higher-order information about the state of the subject T. Using the physiological data 722 for machine learning, the common encoder 61 has its parameters converging toward higher-accuracy local solutions for determining the target person's state from face image data that is easily obtainable in the real environment. The first estimator 51 generated in the present embodiment can estimate the target person's state more accurately from data easily obtainable in the real environment, thus lowering the operational cost of the first estimator 51 in the real environment.

4. Modifications

The embodiment of the present invention described in detail above is a mere example of the present invention in all respects. The embodiment may be variously modified or altered without departing from the scope of the present invention. For example, the embodiment may be modified in the following forms. The same components as those in the above embodiment are hereafter given the same numerals, and the details that are the same as those in the above embodiment will not be described. The modifications described below may be combined as appropriate.

4.1

In the above embodiment, the encoder 61 and the decoder 63 are each constructed using a multilayer, fully connected neural network, and the estimation unit 62 includes the fully connected layer 621. However, the structure and the type of each neural network used for the encoder 61, the estimation unit 62, and the decoder 63 are not limited to the above example, and may be selected as appropriate for each embodiment. For example, the encoder 61 and the decoder 63 may be each constructed using a convolutional neural network including convolutional layers, pooling layers, and fully connected layers. The encoder 61 and the decoder 63 may be each constructed using a recurrent neural network using time-series data.

The learning model used for the encoder 61, the estimation unit 62, and the decoder 63 is not limited to a neural network, and may be selected as appropriate for each embodiment. The encoder 61, the estimation unit 62, and the decoder 63 may each use a regression model such as regression trees or a support-vector regression model. The regression model may be connected to a support-vector machine, a classification tree, a random forest, bagging, boosting, or any combination of these items. The estimation unit 62 may use, for example, a linear regression model. The estimation unit 62 and the decoder 63 may each use, for example, a conditional random field model.

4.2

In the above embodiment, the learning result data 121 includes information indicating the structure of the trained neural network. However, the learning result data 121 may have any other structure determined as appropriate for each embodiment to be usable for setting the trained first estimator 51. For example, when the neural networks used in the apparatuses have the same structure, the learning result data 121 may not include information indicating the structure of the trained neural network.

4.3

In the above embodiment, the learning network 5 includes the first estimator 51 and the second estimator 52 sharing the common encoder 61. Thus, the estimator generation apparatus 1 according to the above embodiment allows the common encoder 61 to have its parameters converging toward better local solutions through machine learning on the second estimator 52, thus improving the accuracy of the first estimator 51. However, the structure of the learning network 5 may not be limited to the above example, and may be modified as appropriate for each embodiment. For example, two modifications below may be used.

First Modification

Figure 8:
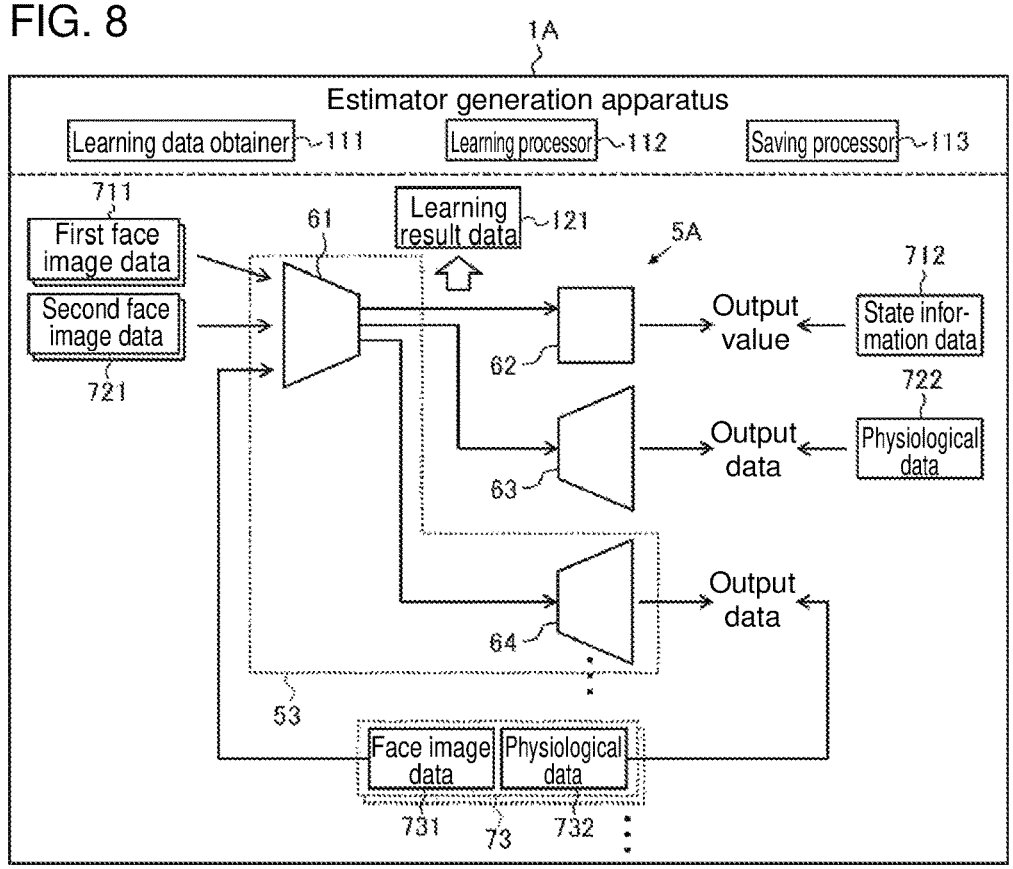
FIG. 8 is a schematic diagram illustrating an estimator generation apparatus according to a modification showing its example software configuration.

FIG. 8 is a schematic diagram of an estimator generation apparatus 1A according to a modification showing its example software configuration. The estimator generation apparatus 1A is similar to the estimator generation apparatus 1 according to the above embodiment in its hardware configuration. As shown in FIG. 8, the estimator generation apparatus 1A is also similar to the estimator generation apparatus 1 according to the above embodiment in its software configuration. Unlike the learning network 5 in the above embodiment, a learning network 5A in the present modification further includes a third estimator 53, a learning data obtainer 111 further obtains multiple third learning datasets 73, and a learning processor 112 further performs machine learning on the third estimator 53 using the multiple third learning datasets 73. The estimator generation apparatus 1A otherwise operates in a manner similar to the estimator generation apparatus 1 according to the above embodiment.

More specifically, the learning network 5A in the present modification includes the first estimator 51, the second estimator 52, and the third estimator 53. The third estimator 53 includes the encoder 61 in the first estimator 51 and a decoder 64 different from the decoder 63 in the second estimator 52. The decoder 64 is an example of the other decoder in an aspect of the present invention. The decoder 64 is constructed using a learning model with machine learning. Similarly to the decoder 63, the decoder 64 may be constructed using a neural network. The decoder 64 is connected to the encoder 61 to receive an output from the encoder 61.

Similarly to the above estimator generation apparatus 1, the estimator generation apparatus 1A includes a controller that performs the processing in step S101 to obtain multiple first learning datasets 71 and multiple second learning datasets 72. In step S101, the controller further obtains the multiple third learning datasets 73 each including a combination of face image data 731 including the face of the subject T and physiological data 732 about the subject T different from the physiological data 722. Each third learning dataset 73 may be collected in the same manner as each second learning dataset 72.

The face image data 731 is an example of the third face image data in an aspect of the present invention. The face image data 731 may be identical to at least one of the first face image data 711 or the second face image data 721. The physiological data 732 is an example of the second physiological data in an aspect of the present invention. The physiological data 732 may be obtained by measuring a physiological parameter different from that for the physiological data 722, or by measuring the same physiological parameter as that for the physiological data 722 at a different time. The physiological data 722 or 732 may be obtained by measuring the same physiological parameter but using different information processing (e.g., the simplification described above).

In step S102, the controller performs machine learning on the third estimator 53 using the multiple third learning datasets 73, as well as machine learning on the first and second estimators 51 and 52. More specifically, the controller trains the third estimator 53 using the face image data 731 included in each third learning dataset 73 as input data, and using the corresponding physiological data 732 as training data. The training may be similar to that for the first estimator 51 described above. More specifically, the controller performs the processing in the first to fourth steps on the encoder 61 and the decoder 64 to be trained instead of the encoder 61 and the estimation unit 62, using the face image data 731 instead of the first face image data 711, and using the physiological data 732 instead of the state information data 712. The controller repeats, for each third learning dataset 73, adjusting the parameter values of the third estimator 53 (the encoder 61 and the decoder 64) through the first to fourth steps until the sum of the error between the output data from the decoder 64 and the physiological data 732 is equal to or below a threshold. The threshold may be set as appropriate for each embodiment. The threshold may be the same as that for machine learning on the first estimator 51 or the second estimator 52, or may be different from any of those for the first estimator 51 and the second estimator 52. Thus, the controller further constructs the third estimator 53 trained to output, in response to the encoder 61 receiving an input of face image data 731 included in a third learning dataset 73, output data reconstructed from the physiological data 732 associated with the input face image data 731, from the decoder 64. Similarly to the above embodiment, the machine learning processes for the first estimator 51, the second estimator 52, and the third estimator 53 may be performed in any order determined as appropriate for each embodiment.

Similarly to the above embodiment, in step S103, the controller operates as the saving processor 113 to save, into the storage 12 as the learning result data 121, information indicating the structure and the parameters of the first estimator 51 constructed through machine learning in step S102. The controller then ends the processing in the present modification. The generated trained first estimator 51 can be used as in the above embodiment. The above monitoring apparatus 2 may estimate the state of the driver D from the face image data 221 using the first estimator 51 generated in the present modification.

In the present modification, the common encoder 61 has the output designed to further determine the physiological data 732 in the process of machine learning on the third estimator 53. This allows generation of the first estimator 51 that can estimate the target person's state more accurately.

Multiple third estimators 53 may be included. The third estimators 53 may be added to the learning network 5A one by one, and the controller may perform machine learning on the added third estimator 53 as well as machine learning on the first and second estimators 51 and 52 in step S102. Upon every completion of the machine learning, the controller may calculate the percentage of correct answers on estimation with the generated trained first estimator 51 for an evaluation dataset that has been prepared. The evaluation dataset may have the structure similar to the first learning dataset 71. Face image data included in the evaluation dataset can be input into the trained first estimator 51, and the percentage of correct answers on estimation with the trained first estimator 51 can be calculated based on whether the output value from the first estimator 51 matches the value corresponding to state information data. In response to a decrease in the percentage of correct answers, the controller may remove the added third estimator 53 from the learning network 5A. This allows generation of the first estimator 51 that can estimate the target person's state more accurately.

Second Modification

Figure 9:
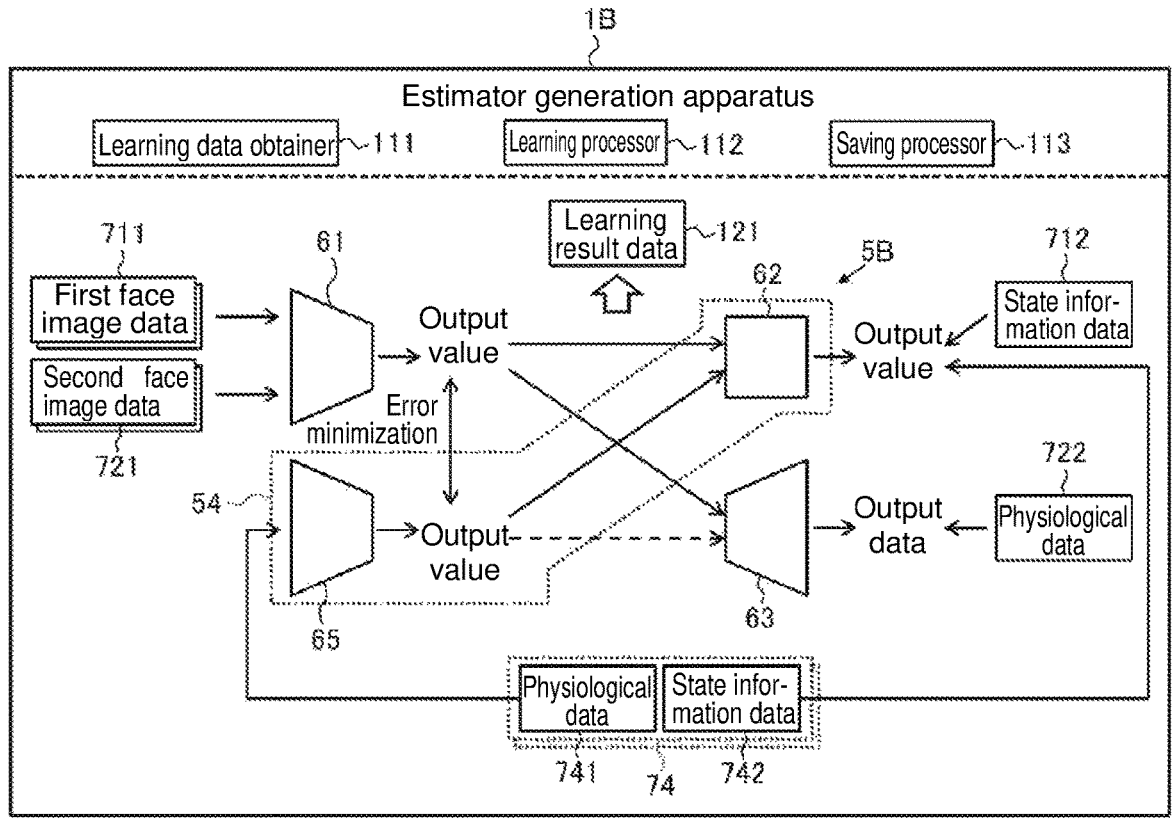
FIG. 9 is a schematic diagram illustrating an estimator generation apparatus according to a modification showing its example software configuration.

FIG. 9 is a schematic diagram of an estimator generation apparatus 1B according to a modification showing its example software configuration. The estimator generation apparatus 1B is similar to the estimator generation apparatus 1 according to the above embodiment in its hardware configuration. As shown in FIG. 9, the estimator generation apparatus 1B is also similar to the estimator generation apparatus 1 according to the above embodiment in its software configuration. Unlike the learning network 5 in the above embodiment, a learning network 5B in the present modification further includes a fourth estimator 54, a learning data obtainer 111 further obtains multiple fourth learning datasets 74, and a learning processor 112 further performs machine learning on the fourth estimator 54 using the multiple fourth learning datasets 74. The estimator generation apparatus 1B otherwise operates in a manner similar to the estimator generation apparatus 1 according to the above embodiment.

More specifically, the learning network 5B in the present modification includes the first estimator 51, the second estimator 52, and the fourth estimator 54. The fourth estimator 54 includes an encoder 65 different from the encoder 61 in the first estimator 51, and the estimation unit 62 in the first estimator 51. The encoder 65 is an example of the other encoder in an aspect of the present invention. The encoder 65 determines the feature quantity from physiological data using a learning model with machine learning. Similarly to the encoder 61, the encoder 65 may be constructed using a neural network. The estimation unit 62 is connected to the encoder 65 to receive an output from the encoder 65. The decoder 63 may be connected to the encoder 65 to receive an output from the encoder 65.

Similarly to the above estimator generation apparatus 1, the estimator generation apparatus 1B includes a controller that performs the processing in step S101 to obtain multiple first learning datasets 71 and multiple second learning datasets 72. In step S101, the controller further obtains the multiple fourth learning datasets 74 each including a combination of physiological data 741 about the subject T and state information data 742 representing the state of the subject T.

The physiological data 741 is an example of the third physiological data in an aspect of the present invention. The state information data 742 is an example of the second state information data in an aspect of the present invention. The physiological data 741 may be the same as or different from the physiological data 722. The state information data 742 may be the same as or different from the state information data 712. The physiological data 741 may be collected in the same manner as the physiological data 722, and the state information data 742 may be collected in the same manner as the state information data 712.

In step S102, the controller performs machine learning on the fourth estimator 54 using the multiple fourth learning datasets 74, as well as machine learning on the first and second estimators 51 and 52. More specifically, the controller trains the fourth estimator 54 using the physiological data 741 included in each fourth learning dataset 74 as input data, and using the corresponding state information data 742 as training data. The training may be basically similar to that in the above embodiment. More specifically, the controller performs the processing in the first to fourth steps on the encoder 65 and the estimation unit 62 to be trained instead of the encoder 61 and the estimation unit 62, using the physiological data 741 instead of the first face image data 711, and using the state information data 742 instead of the state information data 712. The controller calculates, for each fourth learning dataset 74, the error between the output value from the estimation unit 62 and the value corresponding to the state information data 742, and updates the parameter values of the encoder 65 and the estimation unit 62 based on the calculated error.

The controller further trains, in the process of machine learning, the first estimator 51 and the fourth estimator 54 to minimize the error between the output from the encoder 61 and the output from the encoder 65. More specifically, when the state information data 712 and the state information data 742 match, the controller calculates the error between the output value from the encoder 61 that has received an input of the first face image data 711 associated with the state information data 712 and the output value from the encoder 65 that has received an input of the physiological data 741 associated with the state information data 742. The controller then updates the parameter values of the encoders 61 and 65 based on the calculated error.

The controller repeats, for each fourth learning dataset 74, adjusting the parameter values until the sum of the error between the output value from the estimation unit 62 and the state information data 712 is equal to or below a threshold, and until the sum of the error between the output value from the encoder 61 and the output value from the encoder 65 in determining identical state information data is equal to or below a threshold. The thresholds may be set as appropriate for each embodiment.

The controller may perform machine learning on the estimators 51 and 54 simultaneously, or may perform machine learning on one of the estimators 51 and 54 and then perform machine learning on the other of the estimators 51 and 54. For example, the controller may perform machine learning on the fourth estimator 54 and then may perform machine learning on the first estimator 51. In this case, the controller updates the parameter values of the encoder 61 to minimize the error in output between the encoders 61 and 65 with the parameter values of the encoder 65 in the fourth estimator 54 being fixed.

Thus, when the state information data 712 and the state information data 742 match, the controller can train the first estimator 51 and the fourth estimator 54 to decrease, below a threshold, the sum of the error between the output value from the encoder 61 that has received an input of the corresponding first face image data 711 and the output value from the encoder 65 that has received an input of the corresponding physiological data 741. The controller also constructs the fourth estimator 54 trained to output, in response to the encoder 65 receiving an input of physiological data 741 included in a fourth learning dataset 74, an output value corresponding to the state of the subject T represented by the state information data 742 associated with the input physiological data 741, from the estimation unit 62.

When the decoder 63 is connected to the encoder 65 to receive an output from the encoder 65, the controller may train the encoder 65 and the decoder 63 through machine learning to output, in response to the encoder 65 receiving an input of physiological data 741 in a fourth learning dataset 74, output data reconstructed from the physiological data 741, from the decoder 63. The controller can perform machine learning on the encoder 65 and the decoder 63 as with machine learning on the estimators 51 to 54 described above.

Similarly to the above embodiment, in step S103, the controller operates as the saving processor 113 to save, into the storage 12 as the learning result data 121, information indicating the structure and the parameters of the first estimator 51 constructed through machine learning in step S102. The controller then ends the processing in the present modification. The generated trained first estimator 51 can be used as in the above embodiment. The above monitoring apparatus 2 may estimate the state of the driver D from the face image data 221 using the first estimator 51 generated in the present modification.

In the present modification, the fourth estimator 54 is trained to estimate the target person's state from physiological data. Using physiological data, which can include higher-order information than face image data, more accurate estimation of the target person's state is expected than using face image data. Thus, the fourth estimator 54 is expected to estimate the target person's state more accurately than the first estimator 51. In other words, when the first estimator 51 and the fourth estimator 54 are trained individually, the encoder 65 in the fourth estimator 54 has the output that can indicate the target person's state more accurately than the encoder 61 in the first estimator 51.

In the present modification, the controller uses the output from the encoder 65 in the fourth estimator 54 as a sample for the output from the encoder 61 in the first estimator 51 for estimating the target person's state more accurately. In other words, the controller trains the encoders 61 and 65 to allow the error between the output from the encoder 61 and the output from the encoder 65 to be below a threshold in the process of machine learning. Thus, the encoder 61 in the first estimator 51 has its parameters converging toward higher-accuracy local solutions for estimating the target person's state. The first estimator 51 generated in the present modification can estimate the target person's state more accurately.

In the present modification, the fourth estimator 54 receives an input of the physiological data 741. However, the fourth estimator 54 may have any other structure as appropriate for each embodiment. For example, the fourth estimator 54 may receive an input of a combination of face image data and physiological data. In this case, the fourth estimator 54, which uses both face image data and physiological data as input, outperforms the first estimator 51. The estimators 51 and 54 each receive an input of the same face image data and can thus have their encoders 61 and 65 having parameters with similar values. Using this, the estimator generation apparatus 1B may perform machine learning on the fourth estimator 54 and then perform machine learning on the first estimator 51 to allow the encoder 61 to imitate the behavior of the encoder 65.

4.4

The estimator generation apparatus 1 according to the above embodiment is used for estimating the state of the vehicle driver. However, the estimator generation apparatus 1 according to the above embodiment may not be used to generate an estimator for estimating the state of a vehicle driver from face image data including the driver's face. The estimator generation apparatus 1 may be widely used to generate an estimator for estimating the state of a target person performing certain work from face image data including the target person's face.

Figure 10:
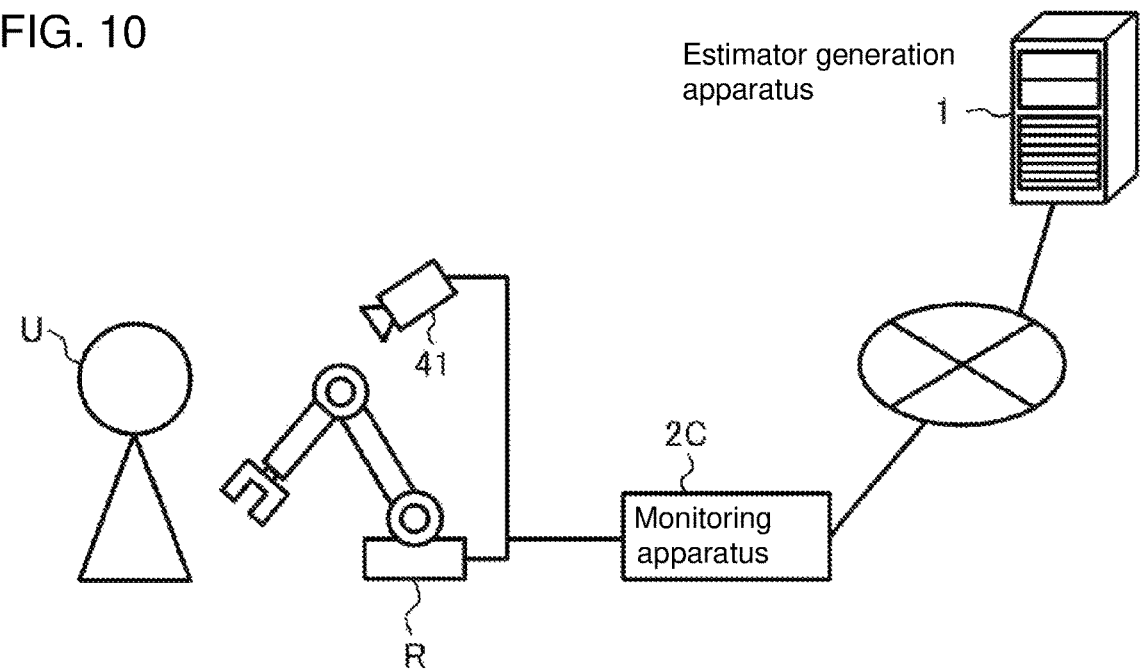
FIG. 10 is a schematic diagram illustrating a modification example use of an estimation system according to one or more embodiments.

FIG. 10 is a schematic diagram describing another example implementation of the present invention. More specifically, FIG. 10 shows an example use of the estimator generation apparatus 1 according to the above embodiment in generating an estimator for estimating the state of a worker U in a production worksite from face image data obtained by capturing the face of the worker U. The worker U is performing a task of each process included in the production line as predetermined work. In the modification, the target person included in face image data is a worker on the production line instead of a vehicle driver. The modification is otherwise similar to the above embodiment.

More specifically, in step S101, the controller 11 obtains multiple first learning datasets each including a combination of first face image data and state information data. The first face image data includes the face of a subject performing predetermined work, and the state information data represents the state of the subject during the predetermined work. The controller 11 obtains multiple second learning datasets each including a combination of second face image data and physiological data. The second face image data includes the face of the subject, and the physiological data is obtained by measuring a physiological parameter about the subject with one or more sensors. Each first learning dataset may be collected in the real environment, and each second learning dataset may be collected in the experimental environment. In the present modification, the predetermined work is a task on the production line. However, the predetermined work is not limited to the above example, and may be selected as appropriate for each embodiment.

In step S102, the controller 11 performs machine learning on the first estimator 51 using the obtained multiple first learning datasets. The controller 11 also performs machine learning on the second estimator 52 using the obtained multiple second learning datasets. Thus, the controller 11 constructs the first estimator 51 trained to output, in response to the encoder 61 receiving an input of first face image data included in a first learning dataset, an output value corresponding to the subject's state represented by the corresponding state information data, from the estimation unit 62. The controller 11 also constructs the second estimator 52 trained to output, in response to the encoder 61 receiving an input of second face image data included in a second learning dataset, output data reconstructed from the corresponding physiological data, from the decoder 63. The training may be similar to that in the above embodiment.

In step S103, the controller 11 saves, into the storage 12 as the learning result data 121, information indicating the structure and the parameters of the first estimator 51 constructed through machine learning in step S102. The controller 11 then ends the processing in the present modification. The estimator generation apparatus 1 according to the present modification thus generates the first estimator 51 that can estimate the worker's state more accurately.

A monitoring apparatus 2C uses the first estimator 51 constructed by the estimator generation apparatus 1 according to the present modification to estimate the state of the worker U working with a robotic device R on the production line from face image data obtained by capturing the worker U with the camera 41. The monitoring apparatus 2C may be similar to the monitoring apparatus 2 according to the above embodiment in its hardware and software configurations. The monitoring apparatus 2C operates in a manner similar to the monitoring apparatus 2 according to the above embodiment, but uses face image data representing the target person other than the driver.

More specifically, in step S201, the controller in the monitoring apparatus 2C obtains face image data including the face of the worker U from the camera 41. In the next step S202, the controller inputs the obtained face image data into the trained first estimator 51, and performs arithmetic processing in the trained first estimator 51 to obtain, from the first estimator 51, an output value corresponding to the estimated state of the worker U. In the next step S203, the controller outputs information about the estimated state of the worker U.

In step S203 in the present modification, the details of the information to be output may be selected as appropriate for each embodiment, similarly to the above embodiment. For example, the first estimator 51 may be used for estimating, as the state of the worker U, the drowsiness level, the fatigue level, the capacity level, or any combination of such states of the worker U. In this case, the controller may determine whether at least one of the drowsiness level or the fatigue level exceeds a threshold. When at least one of the drowsiness level or the fatigue level exceeds the threshold, the controller may output a message through an output device to prompt the worker to suspend the work and take a rest. The controller may transmit, through a network, the message to a user terminal of, for example, the worker U or the supervisor for the worker U.

In some embodiments, the controller may output an instruction for performing the operation determined in accordance with the estimated state of the worker U to the robotic device R as information about the estimated state. For example, when the estimated fatigue level of the worker U is high, the controller in the monitoring apparatus 2C may instruct the robotic device R to assist a larger proportion of the work. When the capacity level of the worker U is high, the controller in the monitoring apparatus 2C may instruct the robotic device R to assist a smaller proportion of the work. Thus, the monitoring apparatus 2C in the present modification can estimate the state of the worker U from face image data using the first estimator 51 generated by the estimator generation apparatus 1. The monitoring apparatus 2C can also control the operation of the robotic device R based on the estimated state.

4.5

The above embodiment and the modifications are implementations of the present invention in estimating the state of the target person performing certain work from face image data. However, the present invention is not limited to estimating the target person's state from face image data, and may be widely used for any other estimation of the target person's state from image data including the target person.

Figure 11:
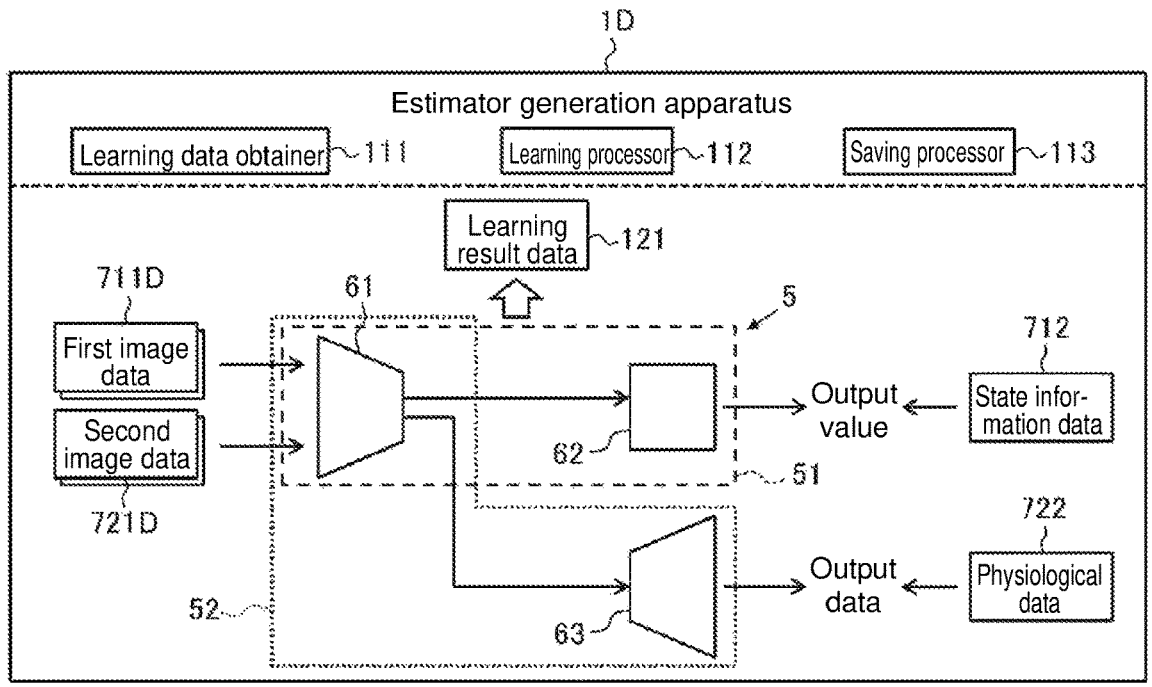
FIG. 11 is a schematic diagram illustrating an estimator generation apparatus according to a modification showing its example software configuration.

FIG. 11 is a schematic diagram of an estimator generation apparatus 1D according to a modification showing its example software configuration. The estimator generation apparatus 1D is similar to the estimator generation apparatus 1 according to the above embodiment in its hardware configuration. As shown in FIG. 11, the estimator generation apparatus 1D is also similar to the estimator generation apparatus 1 according to the above embodiment in its software configuration. The estimator generation apparatus 1D operates in a manner similar to the estimator generation apparatus 1 according to the above embodiment, but uses first image data 711D instead of the first face image data 711 and uses second image data 721D instead of the second face image data 721.

More specifically, in step S101, the controller in the estimator generation apparatus 1D operates as the learning data obtainer 111 to obtain multiple first learning datasets each including a combination of the first image data 711D and the state information data 712. The first image data 711D includes a subject performing predetermined work, and the state information data 712 represents the state of the subject during the predetermined work. The controller also obtains multiple second learning datasets each including a combination of the second image data 721D and the physiological data 722. The second image data 721D includes the subject, and the physiological data 722 is obtained by measuring a physiological parameter about the subject with one or more sensors. The predetermined work may be selected as appropriate for each embodiment. For example, the predetermined work may be vehicle driving or a task on the production line.

In step S102, the controller operates as the learning processor 112 to perform machine learning on the first estimator 51 using the obtained multiple first learning datasets. The controller also performs machine learning on the second estimator 52 using the obtained multiple second learning datasets. Thus, the controller constructs the first estimator 51 trained to output, in response to the encoder 61 receiving an input of first image data 711D included in a first learning dataset, an output value corresponding to the subject's state represented by the state information data 712 associated with the input first image data 711D, from the estimation unit 62. The controller also constructs the second estimator 52 trained to output, in response to the encoder 61 receiving an input of second image data 721D included in a second learning dataset, output data reconstructed from the physiological data 722 associated with the input second image data 721D, from the decoder 63. The training may be similar to that in the above embodiment.

In step S103, the controller operates as the saving processor 113 to save, into the storage 12 as the learning result data 121, information indicating the structure and the parameters of the first estimator 51 constructed through machine learning in step S102. The controller then ends the processing in the present modification. The estimator generation apparatus 1D according to the present modification thus generates the first estimator 51 that can estimate the target person's state more accurately from image data.

Figure 12:
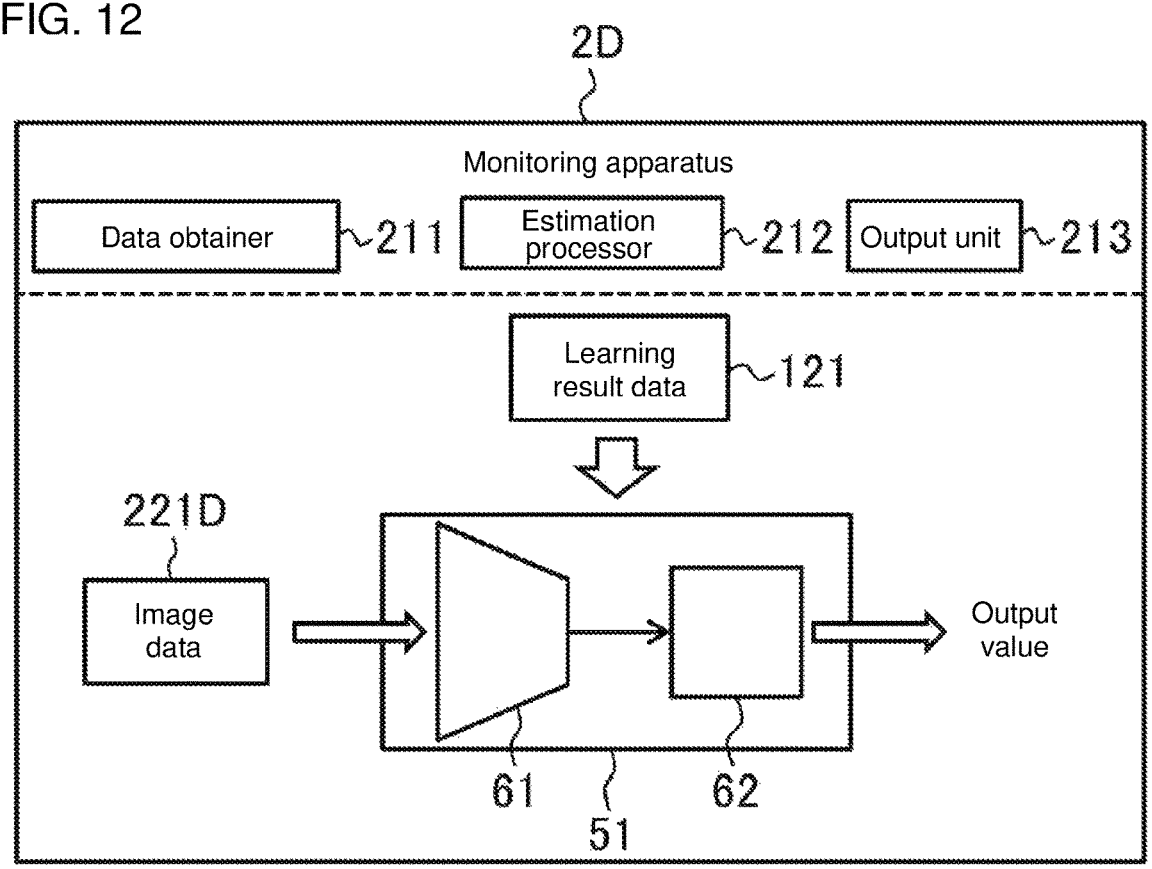
FIG. 12 is a schematic diagram illustrating a monitoring apparatus according to a modification showing its example software configuration.

FIG. 12 is a schematic diagram of a monitoring apparatus 2D according to the modification showing its example software configuration. The monitoring apparatus 2D in the present modification estimates the target person's state from image data using the first estimator 51 generated by the estimator generation apparatus 1D. The monitoring apparatus 2D may be similar to the monitoring apparatus 2 according to the above embodiment in its hardware configuration. As shown in FIG. 12, the monitoring apparatus 2D is also similar to the monitoring apparatus 2 according to the above embodiment in its software configuration. The monitoring apparatus 2D operates in a manner similar to the monitoring apparatus 2 according to the above embodiment, but uses image data 221D instead of the face image data 221.

More specifically, in step S201, the controller in the monitoring apparatus 2D obtains the image data 221D including the target person from the camera. In the next step S202, the controller inputs the image data 221D into the trained first estimator 51, and performs arithmetic processing in the trained first estimator 51 to obtain, from the first estimator 51, an output value corresponding to the estimated state of the target person. In the next step S203, the controller outputs information about the estimated state of the target person. The output format may be selected as appropriate for each embodiment. The monitoring apparatus 2D according to the present modification can thus estimate the target person's state more accurately from image data.

4.6

The above embodiment and the modifications are implementations of the present invention in estimating the state of the target person performing certain work from image data including the target person. However, the present invention is not limited to estimating the target person's state from image data, and may be widely used for any other estimation of the target person's state from observation data obtained by observing the target person's activity.

Figure 13:
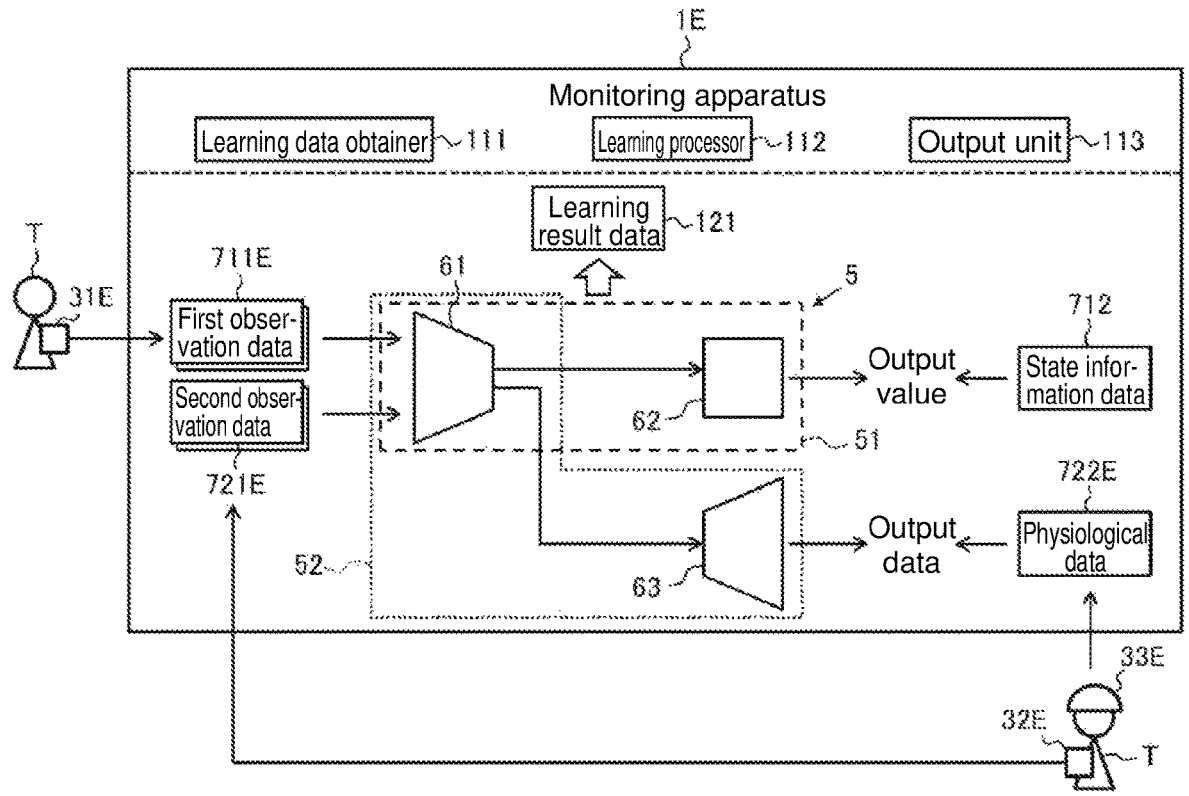
FIG. 13 is a schematic diagram illustrating an estimator generation apparatus according to a modification showing its example software configuration.

FIG. 13 is a schematic diagram of an estimator generation apparatus 1E according to a modification showing its example software configuration. The estimator generation apparatus 1E is similar to the estimator generation apparatus 1 according to the above embodiment in its hardware configuration. As shown in FIG. 13, the estimator generation apparatus 1E is also similar to the estimator generation apparatus 1 according to the above embodiment in its software configuration. The estimator generation apparatus 1E operates in a manner similar to the estimator generation apparatus 1 according to the above embodiment, but uses first observation data 711E instead of the first face image data 711 and uses second observation data 721E instead of the second face image data 721.

More specifically, in step S101, the controller in the estimator generation apparatus 1E operates as the learning data obtainer 111 to obtain multiple first learning datasets each including a combination of the first observation data 711E and the state information data 712. The first observation data 711E is obtained by measuring the activity of a subject T performing predetermined work with one or more first sensors 31E, and the state information data 712 represents the state of the subject T during the predetermined work. The controller also obtains multiple second learning datasets each including a combination of the second observation data 721E and the physiological data 722E. The second observation data 721E is obtained by measuring the activity of the subject T with one or more first sensors 32E, and the physiological data 722E is obtained by measuring a physiological parameter about the subject T with one or more second sensors 33E different from the first sensors 32E.

The first sensors 31E and 32E and the second sensors 33E may be any sensors selected as appropriate for each embodiment. The first sensors 31E and 32E may be the same as or different from the second sensors 33E. The second sensors 33E may have higher performance and obtain higher-order information about the human state than the first sensors 31E and 32E. The first sensors 31E and 32E may be less expensive than the second sensors 33E.

The first observation data 711E and the state information data 712 included in each first learning dataset may be collected in the real environment. The second observation data 721E and the physiological data 722E included in each second learning dataset may be collected in the experimental environment. The first sensors 31E and 32E may accordingly include a camera, an EOG sensor, an eye tracker, a microphone, a blood pressure meter, a pulsimeter, a cardiotachometer, a clinical thermometer, a GSR meter, a load sensor, an operational device, or any combination of these sensors. The load sensor may measure the load at one point or measure the distribution of load. The operational device may be selected as appropriate for each embodiment to be operable by the target person to undergo state estimation. When the target person is a vehicle driver as in the above embodiment, the operational device may be, for example, a steering wheel, a brake, or an accelerator. In this case, the observation data 711E and the observation data 721E include, for example, image data, EOG data, gaze measurement data, voice data, blood pressure data, pulse data, heart rate data, body temperature data, GSR data, load measurement data, operational logs, or any combination of these items. The operational logs indicate the operational histories of the operational device. The second sensors 33E may include an EEG, an MEG, an MRI system, an EMG, an electrocardiograph, a pupillometer, or any combination of these sensors.

The first sensors are also used with the first estimator 51 used in the real environment. More specifically, the first sensors are used to obtain observation data about the target person performing the predetermined work. Thus, the first sensors 31E and 32E may measure the activity of the subject T without restricting body motions of the subject T. The sensors without restricting body motions include sensors out of contact with the subject, such as cameras or microphones, and sensors in contact with a part of the subject's body but substantially without restricting motions of the body part, such as wristwatch devices or glass devices. The second sensors 33E that can collect higher-order information may restrict the body motions of the subject T. The sensors restricting body motions include sensors attached to at least a part of the body of the subject T and restricting motions of the body part, such as EEGs, and sensors out of contact with the body of the subject T but measuring the subject T staying at a certain place other than the place of the predetermined work, such as MRI systems.

In step S102, the controller operates as the learning processor 112 to perform machine learning on the first estimator 51 using the obtained multiple first learning datasets. The controller also performs machine learning on the second estimator 52 using the obtained multiple second learning datasets. Thus, the controller constructs the first estimator 51 trained to output, in response to the encoder 61 receiving an input of first observation data 711E included in a first learning dataset, an output value corresponding to the state of the subject T represented by the state information data 712 associated with the input first observation data 711E, from the estimation unit 62. The controller also constructs the second estimator 52 trained to output, in response to the encoder 61 receiving an input of second observation data 721E included in a second learning dataset, output data reconstructed from the physiological data 722E associated with the input second observation data 721E, from the decoder 63.

In step S103, the controller saves, into the storage 12 as the learning result data 121, information indicating the structure and the parameters of the first estimator 51 constructed through machine learning in step S102. The controller then ends the processing in the present modification. The estimator generation apparatus 1E according to the present modification thus generates the first estimator 51 that can estimate the target person's state more accurately from observation data.

Figure 14:
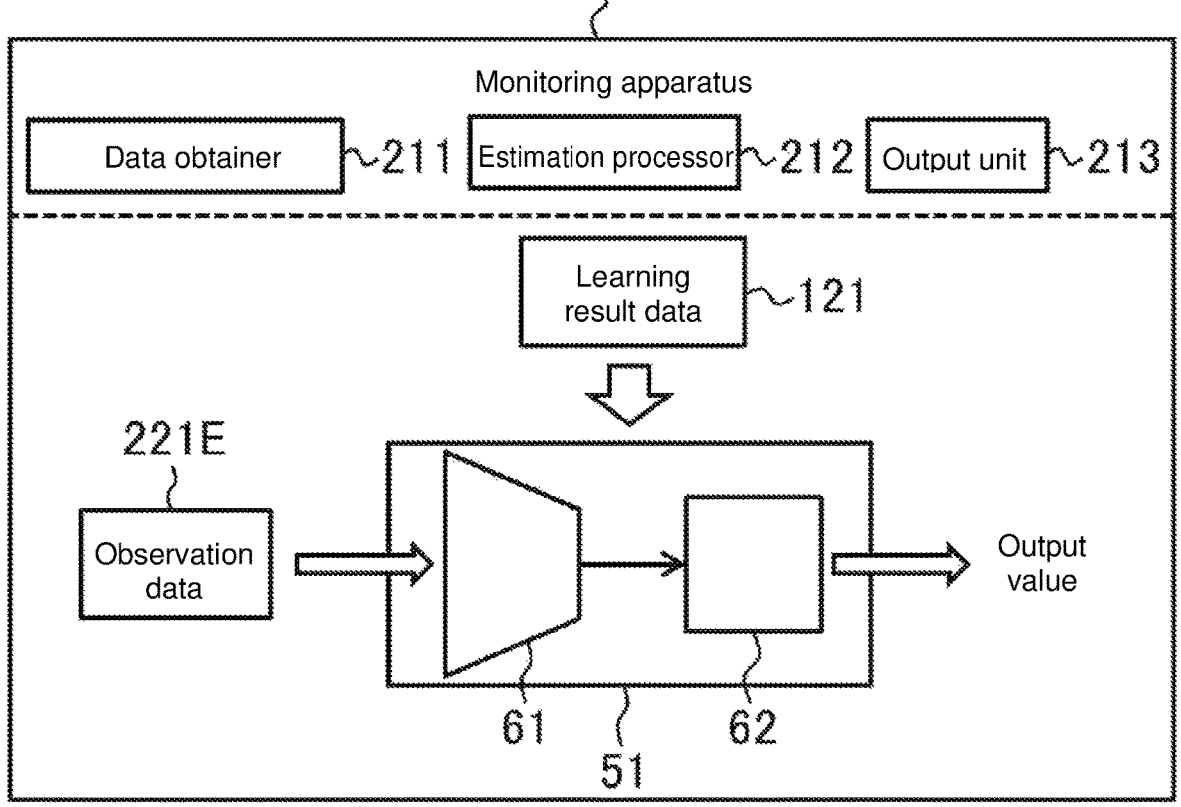
FIG. 14 is a schematic diagram illustrating a monitoring apparatus according to a modification showing its example software configuration.

FIG. 14 is a schematic diagram of a monitoring apparatus 2E according to a modification showing its example software configuration. The monitoring apparatus 2E in the present modification estimates the target person's state from observation data using the first estimator 51 generated by the estimator generation apparatus 1E. The monitoring apparatus 2E may be similar to the monitoring apparatus 2 according to the above embodiment in its hardware configuration. As shown in FIG. 14, the monitoring apparatus 2E is also similar to the monitoring apparatus 2 according to the above embodiment in its software configuration. The monitoring apparatus 2E operates in a manner similar to the monitoring apparatus 2 according to the above embodiment, but uses observation data 221E instead of the face image data 221.

More specifically, in step S201, the controller in the monitoring apparatus 2E obtains the observation data 221E obtained by measuring the activity of a target person performing predetermined work with one or more first sensors. In the next step S202, the controller inputs the observation data 221E into the trained first estimator 51, and performs arithmetic processing in the trained first estimator 51 to obtain, from the first estimator 51, an output value corresponding to the estimated state of the target person. In the next step S203, the controller outputs information about the estimated state of the target person. The output format may be selected as appropriate for each embodiment. The monitoring apparatus 2E according to the present modification can thus estimate the target person's state more accurately from observation data.

Addendum 1

An estimator generation method implementable by a computer, the method comprising:
  obtaining a plurality of first learning datasets each including a combination of first face image data and state information data, the first face image data including a face of a subject driving a vehicle, the state information data representing a state of the subject during driving of the vehicle;
  obtaining a plurality of second learning datasets each including a combination of second face image data and physiological data, the second face image data including the face of the subject, the physiological data being obtained by measuring a physiological parameter about the subject with a sensor; and
  constructing a first estimator by performing machine learning on the first estimator, the first estimator including an encoder and an estimation unit connected to the encoder to receive an output from the encoder, the first estimator being trained to output, in response to the encoder receiving an input of the first face image data included in a first learning dataset of the plurality of first learning datasets, an output value corresponding to the state of the subject represented by the state information data associated with the input first face image data from the estimation unit, and constructing a second estimator by performing machine learning on the second estimator, the second estimator including the encoder in the first estimator and a decoder connected to the encoder to receive an output from the encoder, the second estimator being trained to output, in response to the encoder receiving an input of the second face image data included in a second learning dataset of the plurality of second learning datasets, output data reconstructed from the physiological data associated with the input second face image data from the decoder.

Addendum 2

A non-transitory computer-readable storage medium storing an estimator generation program, which when read and executed, causes a computer to perform operations comprising:
  obtaining a plurality of first learning datasets each including a combination of first face image data and state information data, the first face image data including a face of a subject driving a vehicle, the state information data representing a state of the subject during driving of the vehicle;
  obtaining a plurality of second learning datasets each including a combination of second face image data and physiological data, the second face image data including the face of the subject, the physiological data being obtained by measuring a physiological parameter about the subject with a sensor; and
  constructing a first estimator by performing machine learning on the first estimator, the first estimator including an encoder and an estimation unit connected to the encoder to receive an output from the encoder, the first estimator being trained to output, in response to the encoder receiving an input of the first face image data included in a first learning dataset of the plurality of first learning datasets, an output value corresponding to the state of the subject represented by the state information data associated with the input first face image data from the estimation unit, and constructing a second estimator by performing machine learning on the second estimator, the second estimator including the encoder in the first estimator and a decoder connected to the encoder to receive an output from the encoder, the second estimator being trained to output, in response to the encoder receiving an input of the second face image data included in a second learning dataset of the plurality of second learning datasets, output data reconstructed from the physiological data associated with the input second face image data from the decoder.

REFERENCE SIGNS LIST 1 estimator generation apparatus
11 controller
12 storage
13 communication interface
14 input device
15 output device
16 drive
111 learning data obtainer
112 learning processor 113 saving processor
121 learning result data
81 estimator generation program
91 storage medium
2 monitoring apparatus
21 controller
22 storage
23 communication interface
24 external interface
25 input device
26 output device
211 data obtainer
212 estimation processor
213 output unit
221 face image data
82 monitoring program
31 camera
32 camera
33 electroencephalograph
41 camera
5 learning network
51 first estimator
52 second estimator
53 third estimator
54 fourth estimator
61 encoder
62 estimation unit
63 decoder
64 (another) decoder
65 (another) encoder
71 first learning dataset
711 first face image data
712 (first) state information data
72 second learning dataset
721 second face image data
722 (first) physiological data
73 third learning dataset
731 (third) face image data
732 (second) physiological data
74 fourth learning dataset
741 (third) physiological data
742 (second) state information data
T subject
D driver (target person)

The invention claimed is:

1. An estimator generation apparatus, comprising:
a learning data obtainer configured to
obtain a plurality of first learning datasets each including a combination of first face image data and first state information data, the first face image data including a face of a subject driving a vehicle, the first state information data representing a state of the subject during driving of the vehicle, and
obtain a plurality of second learning datasets each including a combination of second face image data and first physiological data, the second face image data including the face of the subject, the first physiological data being obtained by measuring a physiological parameter about the subject with a sensor; and
a learning processor configured to
construct a first estimator by performing machine learning on the first estimator, the first estimator including an encoder and an estimation unit connected to the encoder to receive an output from the encoder, the first estimator being trained to output, in response to the encoder receiving an input of the first face image data included in a first learning dataset of the plurality of first learning datasets, an output value corresponding to the state of the subject represented by the first state information data associated with the input first face image data from the estimation unit, and
construct a second estimator by performing machine learning on the second estimator, the second estimator including the encoder in the first estimator and a decoder connected to the encoder to receive an output from the encoder, the second estimator being trained to output, in response to the encoder receiving an input of the second face image data included in a second learning dataset of the plurality of second learning datasets, output data reconstructed from the first physiological data associated with the input second face image data from the decoder.

2. The estimator generation apparatus according to claim 1, wherein
the first face image data and the first state information data included in each of the plurality of first learning datasets are collected in a real environment, and
the second face image data and the first physiological data included in each of the plurality of second learning datasets are collected in an experimental environment.

3. The estimator generation apparatus according to claim 1, wherein
the physiological parameter includes at least one selected from the group consisting of a brain activity, a myogenic potential, a cardiac potential, and an eye movement.

4. The estimator generation apparatus according to claim 1, wherein
the first state information data includes the state of the subject including at least one selected from the group consisting of a drowsiness level indicating a level of drowsiness of the subject, a fatigue level indicating a level of fatigue of the subject, and a capacity level indicating a level of capacity of the subject for driving.

5. The estimator generation apparatus according to claim 1, wherein
the learning data obtainer further obtains a plurality of third learning datasets each including a combination of third face image data including the face of the subject and second physiological data about the subject different from the first physiological data, and
the learning processor further constructs a third estimator by performing machine learning on the third estimator, and the machine learning on the first estimator and the machine learning on the second estimator, the third estimator includes the encoder in the first estimator and another decoder different from the decoder in the second estimator, the other decoder is connected to the encoder to receive an output from the encoder, and the third estimator is trained to output, in response to the encoder receiving an input of the third face image data included in a third learning dataset of the plurality of third learning datasets, output data reconstructed from the second physiological data associated with the input third face image data from the other decoder.

6. The estimator generation apparatus according to claim 1, wherein
the learning data obtainer further obtains a plurality of fourth learning datasets each including a combination of third physiological data about the subject and second state information data representing a state of the subject,
the learning processor constructs a fourth estimator by performing machine learning on the fourth estimator, and the machine learning on the first estimator and the machine learning on the second estimator, the fourth estimator includes another encoder different from the encoder in the first estimator and the estimation unit in the first estimator, the estimation unit is connected to the other encoder to receive an output from the other encoder, and the fourth estimator is trained to output, in response to the other encoder receiving an input of the third physiological data included in a fourth learning dataset of the plurality of fourth learning datasets, an output value corresponding to the state of the subject represented by the second state information data associated with the input third physiological data from the estimation unit, and during the machine learning, in response to the first state information data and the second state information data matching each other, the first estimator and the fourth estimator are trained to reduce, to below a threshold, an error between the output value from the encoder receiving an input of the first face image data associated with the first state information data and the output value from the other encoder receiving an input of the third physiological data associated with the second state information data.

7. A monitoring apparatus, comprising:
a data obtainer configured to obtain face image data including a face of a target person driving a vehicle;
an estimation processor configured to input the obtained face image data into the encoder in the first estimator constructed by the estimator generation apparatus according to claim 1, and obtain, from the estimation unit in the first estimator, an output corresponding to an estimated state of the target person; and
an output unit configured to output information about the estimated state of the target person.

8. An estimator generation apparatus, comprising:
a learning data obtainer configured to
obtain a plurality of first learning datasets each including a combination of first image data and state information data, the first image data including a subject performing predetermined work, the state information data representing a state of the subject during the predetermined work, and
obtain a plurality of second learning datasets each including a combination of second image data and physiological data, the second image data including the subject, the physiological data being obtained by measuring a physiological parameter about the subject with a sensor; and
a learning processor configured to
construct a first estimator by performing machine learning on the first estimator, the first estimator including an encoder and an estimation unit connected to the encoder to receive an output from the encoder, the first estimator being trained to output, in response to the encoder receiving an input of the first image data included in a first learning dataset of the plurality of first learning datasets, an output value corresponding to the state of the subject represented by the state information data associated with the input first image data from the estimation unit, and
construct a second estimator by performing machine learning on the second estimator, the second estimator including the encoder in the first estimator and a decoder connected to the encoder to receive an output from the encoder, the second estimator being trained to output, in response to the encoder receiving an input of the second image data included in a second learning dataset of the plurality of second learning datasets, output data reconstructed from the physiological data associated with the input second image data from the decoder.

9. An estimator generation apparatus, comprising:
a learning data obtainer configured to
obtain a plurality of first learning datasets each including a combination of first observation data and state information data, the first observation data being obtained by measuring an activity of a subject performing predetermined work with a first sensor, the state information data representing a state of the subject during the predetermined work, and
obtain a plurality of second learning datasets each including a combination of second observation data and physiological data, the second observation data being obtained by measuring an activity of the subject with the first sensor, the physiological data being obtained by measuring a physiological parameter about the subject with a second sensor different from the first sensor; and
a learning processor configured to
construct a first estimator by performing machine learning on the first estimator, the first estimator including an encoder and an estimation unit connected to the encoder to receive an output from the encoder, the first estimator being trained to output, in response to the encoder receiving an input of the first observation data included in a first learning dataset of the plurality of first learning datasets, an output value corresponding to the state of the subject represented by the state information data associated with the input first observation data from the estimation unit, and
construct a second estimator by performing machine learning on the second estimator, the second estimator including the encoder in the first estimator and a decoder connected to the encoder to receive an output from the encoder, the second estimator being trained to output, in response to the encoder receiving an input of the second observation data included in a second learning dataset of the plurality of second learning datasets, output data reconstructed from the physiological data associated with the input second observation data from the decoder.

10. The estimator generation apparatus according to claim 9, wherein
the first observation data and the state information data included in each of the plurality of first learning datasets are collected in a real environment, and
the second observation data and the physiological data included in each of the plurality of second learning datasets are collected in an experimental environment.

11. The estimator generation apparatus according to claim 9, wherein
the first sensor includes at least one selected from the group consisting of a camera, an electrooculography sensor, a microphone, a blood pressure meter, a pulsimeter, a cardiotachometer, a clinical thermometer, a galvanic skin reflex meter, an eye tracker, a load sensor, and an operational device, and
the second sensor includes at least one selected from the group consisting of an electroencephalograph, a magnetoencephalograph, a magnetic resonance imaging system, an electromyograph, an electrocardiograph, and a pupillometer.

12. The estimator generation apparatus according to claim 2, wherein
the physiological parameter includes at least one selected from the group consisting of a brain activity, a myogenic potential, a cardiac potential, and an eye movement.

13. The estimator generation apparatus according to claim 2, wherein
the first state information data includes the state of the subject including at least one selected from the group consisting of a drowsiness level indicating a level of drowsiness of the subject, a fatigue level indicating a level of fatigue of the subject, and a capacity level indicating a level of capacity of the subject for driving.

14. The estimator generation apparatus according to claim 3, wherein
the first state information data includes the state of the subject including at least one selected from the group consisting of a drowsiness level indicating a level of drowsiness of the subject, a fatigue level indicating a level of fatigue of the subject, and a capacity level indicating a level of capacity of the subject for driving.

15. The estimator generation apparatus according to claim 2, wherein
the learning data obtainer further obtains a plurality of third learning datasets each including a combination of third face image data including the face of the subject and second physiological data about the subject different from the first physiological data, and
the learning processor further constructs a third estimator by performing machine learning on the third estimator, and the machine learning on the first estimator and the machine learning on the second estimator, the third estimator includes the encoder in the first estimator and another decoder different from the decoder in the second estimator, the other decoder is connected to the encoder to receive an output from the encoder, and the third estimator is trained to output, in response to the encoder receiving an input of the third face image data included in a third learning dataset of the plurality of third learning datasets, output data reconstructed from the second physiological data associated with the input third face image data from the other decoder.

16. The estimator generation apparatus according to claim 3, wherein
the learning data obtainer further obtains a plurality of third learning datasets each including a combination of third face image data including the face of the subject and second physiological data about the subject different from the first physiological data, and
the learning processor further constructs a third estimator by performing machine learning on the third estimator, and the machine learning on the first estimator and the machine learning on the second estimator, the third estimator includes the encoder in the first estimator and another decoder different from the decoder in the second estimator, the other decoder is connected to the encoder to receive an output from the encoder, and the third estimator is trained to output, in response to the encoder receiving an input of the third face image data included in a third learning dataset of the plurality of third learning datasets, output data reconstructed from the second physiological data associated with the input third face image data from the other decoder.

17. The estimator generation apparatus according to claim 2, wherein
the learning data obtainer further obtains a plurality of third learning datasets each including a combination of third face image data including the face of the subject and second physiological data about the subject different from the first physiological data, and
the learning processor further constructs a third estimator by performing machine learning on the third estimator, and the machine learning on the first estimator and the machine learning on the second estimator, the third estimator includes the encoder in the first estimator and another decoder different from the decoder in the second estimator, the other decoder is connected to the encoder to receive an output from the encoder, and the third estimator is trained to output, in response to the encoder receiving an input of the third face image data included in a third learning dataset of the plurality of third learning datasets, output data reconstructed from the second physiological data associated with the input third face image data from the other decoder.

18. The estimator generation apparatus according to claim 3, wherein
the learning data obtainer further obtains a plurality of third learning datasets each including a combination of third face image data including the face of the subject and second physiological data about the subject different from the first physiological data, and
the learning processor further constructs a third estimator by performing machine learning on the third estimator, and the machine learning on the first estimator and the machine learning on the second estimator, the third estimator includes the encoder in the first estimator and another decoder different from the decoder in the second estimator, the other decoder is connected to the encoder to receive an output from the encoder, and the third estimator is trained to output, in response to the encoder receiving an input of the third face image data included in a third learning dataset of the plurality of third learning datasets, output data reconstructed from the second physiological data associated with the input third face image data from the other decoder.

19. The estimator generation apparatus according to claim 3, wherein
the learning data obtainer further obtains a plurality of fourth learning datasets each including a combination of third physiological data about the subject and second state information data representing a state of the subject,
the learning processor constructs a fourth estimator by performing machine learning on the fourth estimator, and the machine learning on the first estimator and the machine learning on the second estimator, the fourth estimator includes another encoder different from the encoder in the first estimator and the estimation unit in the first estimator, the estimation unit is connected to the other encoder to receive an output from the other encoder, and the fourth estimator is trained to output, in response to the other encoder receiving an input of the third physiological data included in a fourth learning dataset of the plurality of fourth learning datasets, an output value corresponding to the state of the subject represented by the second state information data associated with the input third physiological data from the estimation unit, and
during the machine learning, in response to the first state information data and the second state information data matching each other, the first estimator and the fourth estimator are trained to reduce, to below a threshold, an error between the output value from the encoder receiving an input of the first face image data associated with the first state information data and the output value from the other encoder receiving an input of the third physiological data associated with the second state information data.

20. A monitoring apparatus, comprising:
a data obtainer configured to obtain face image data including a face of a target person driving a vehicle;
an estimation processor configured to input the obtained face image data into the encoder in the first estimator constructed by the estimator generation apparatus according to claim 2, and obtain, from the estimation unit in the first estimator, an output corresponding to an estimated state of the target person; and
an output unit configured to output information about the estimated state of the target person.

* * * * *